(12) United States Patent
Thomas et al.

(10) Patent No.: US 6,847,395 B2
(45) Date of Patent: Jan. 25, 2005

(54) DIGITAL TELEVISION SIGNAL TEST EQUIPMENT

(75) Inventors: C. Gomer Thomas, Piscataway, NJ (US); Dinkar Bhat, Monmouth Junction, NJ (US); Mark T. Corl, Princeton Junction, NJ (US); David Scott Cammack, Princeton, NJ (US)

(73) Assignee: Triveni Digital Inc., Princeton Junction, NJ (US)

( * ) Notice: Subject to any disclaimer, the term of this patent is extended or adjusted under 35 U.S.C. 154(b) by 663 days.

(21) Appl. No.: 09/833,648

(22) Filed: Apr. 13, 2001

(65) Prior Publication Data

US 2002/0047902 A1 Apr. 25, 2002

Related U.S. Application Data

(60) Provisional application No. 60/197,664, filed on Apr. 17, 2000.

(51) Int. Cl.[7] .............................................. H04N 17/00
(52) U.S. Cl. ........................ 348/180; 348/184; 348/193
(58) Field of Search ............................... 348/180, 181, 348/184, 189, 192, 193; 375/260, 316; 370/252; 381/2, 3, 4, 5; 714/712, 746; H04N 17/00, 17/02

(56) References Cited

U.S. PATENT DOCUMENTS

| | | | | |
|---|---|---|---|---|
| 4,630,266 A | * | 12/1986 | Deparis et al. | 370/252 |
| 5,640,388 A | * | 6/1997 | Woodhead et al. | 370/468 |
| 6,057,882 A | * | 5/2000 | van den Branden Lambrecht et al. | 348/192 |
| 6,188,674 B1 | * | 2/2001 | Chen et al. | 370/252 |
| 6,295,092 B1 | * | 9/2001 | Hullinger et al. | 348/468 |
| 6,366,314 B1 | * | 4/2002 | Goudezeune et al. | 348/192 |
| 6,421,805 B1 | * | 7/2002 | McAuliffe | 714/756 |
| 6,456,605 B1 | * | 9/2002 | Laakso et al. | 370/330 |
| 6,484,143 B1 | * | 11/2002 | Swildens et al. | 705/1 |

FOREIGN PATENT DOCUMENTS

| | | | | |
|---|---|---|---|---|
| JP | 10042258 A | * | 2/1998 | H04N/7/00 |

* cited by examiner

*Primary Examiner*—Sherrie Hsia
(74) *Attorney, Agent, or Firm*—Birch, Stewart, Kolasch & Birch, LLP

(57) ABSTRACT

The invention, in part, provides an integrated digital television (DTV) diagnostic instrument comprising: at least one of a video display device (VDD) and an audio display device (AudDD); DTV circuitry (AV) to receive a DTV signal, to reconstruct at least one of a video stream and an audio stream from the DTV signal, and to display at least one of the video stream and the audio stream on the VDD or the AudDD, respectively; and at least one of monitoring circuitry (M), responsive to the DTV circuitry, to monitor digital properties of a live DTV signal and analysis circuitry (AN), responsive to the DTV circuitry, to analyze digital properties of a recorded DTV signal.

19 Claims, 18 Drawing Sheets

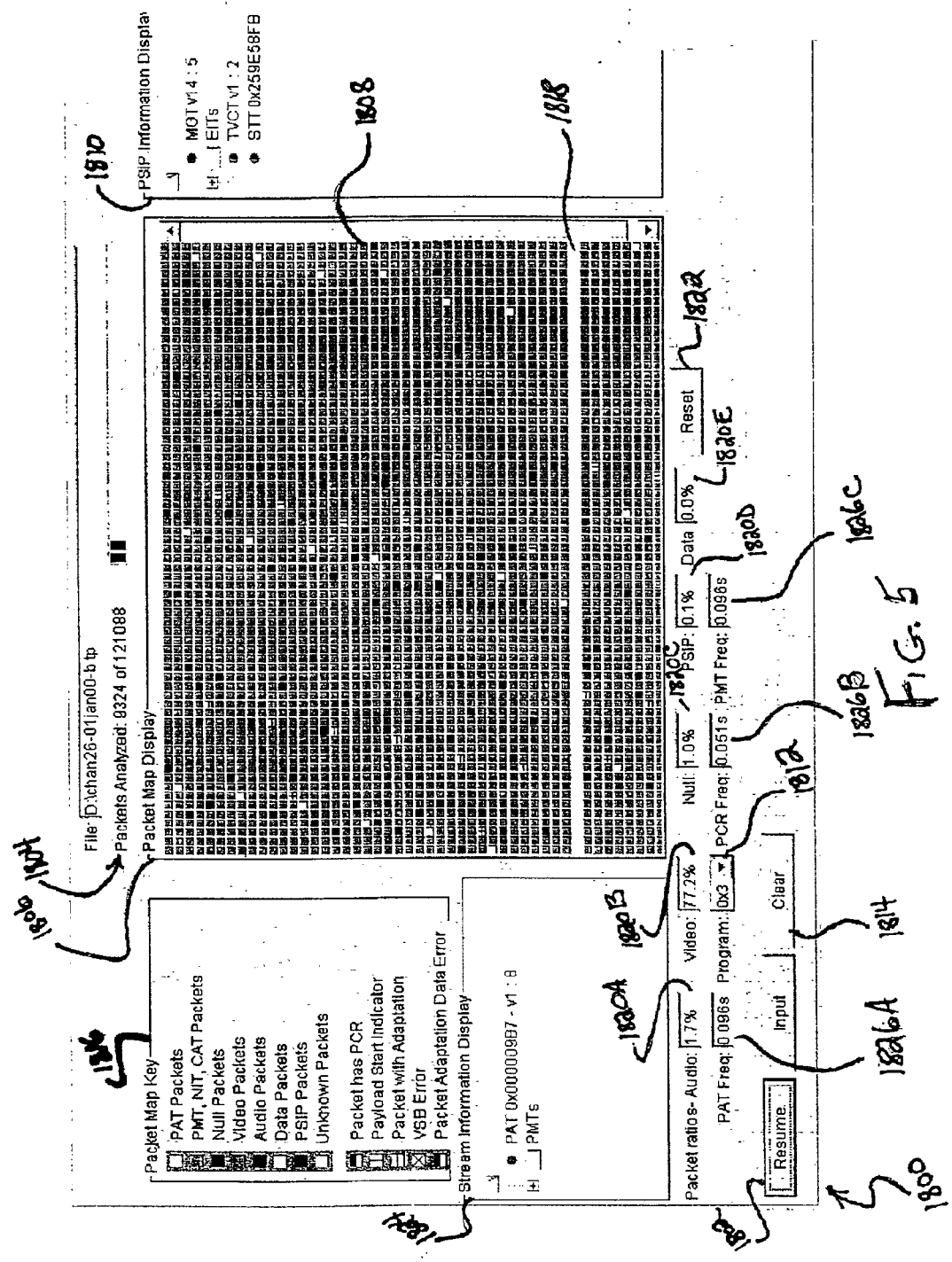

DIGITAL TELEVISION SIGNAL TEST EQUIPMENT

CONTINUING APPLICATION INFORMATION

This application claims priority under 35 U.S.C. §119 upon U.S. Provisional Patent Application, Ser. No. 60/197,664, filed Apr. 17, 2000, the entire contents of which are hereby incorporated by reference.

FIELD OF THE INVENTION

The invention is directed to the field of monitoring/diagnostic equipment, more particularly to such equipment configured for digital television (DTV) signals, especially ATSC compliant DTV signals, and more particularly to such equipment that is easily portable.

BACKGROUND OF THE INVENTION

A digital television (DTV) signal represents a combination of multiple streams of data packets, i.e., it is a packet multiplex. A DTV signal that is compliant with the American Television Standards Committee (ATSC) standard for digital terrestrial television has a packet multiplex that can be depicted as in FIG. 1. Such a DTV packet multiplex is complex. Each data packet in the multiplex contains 188 bytes, a 4-byte header and a 184-byte payload. The packet header contains a 13-bit "packet id" field (PID) that is used to tell what stream the packet belongs to.

A DTV system can include the transmission subsystem and the reception subsystem. Problems with such a DTV system can arise in either subsystem. Engineers and technicians working with a DTV system need a monitoring/diagnostic instrument that meets the specific needs of their circumstances. Some of the tasks performed by such engineers and technicians are included in the following list:

Task 1: Installation and maintenance of digital television broadcast equipment, especially the digital components.

Task 2: Miscellaneous monitoring and troubleshooting tasks for a digital television broadcaster, including informal testing of the station's geographical area of coverage.

Task 3: Continuous monitoring of a digital television broadcast at the broadcast station.

Task 4: Installation and maintenance of high end digital television reception equipment, such as for a home theatre system or a relay station.

To troubleshoot the problems, or merely monitor one or both of the subsystems, of a DTV system, the following general classes of functions can be especially useful.

Function 1: Playing of broadcast digital television audio and video in real time. This allows the user (of the functionality) to check quickly and easily what broadcast signals are actually on the air, whether both audio and video components of the desired programs are present, and whether the data formats are correct (so that a receiver can play them without error). This also gives an immediate indication of whether the signal has "lip sync" problems—situations where the audio and video components of a program are not synchronized correctly, so that lip movements and the corresponding sounds come at slightly different times.

Function 2: Play digital television audio and video from a recorded broadcast stream. This allows a user to check whether audio and video components are present, correctly formatted, and correctly synchronized in a recorded broadcast stream. And it allows problems to be rechecked at a later time and/or to be communicated to someone else who could not observe them in real time.

Function 3: Take digital television input from an antenna, and monitor the quality of the incoming signal. This allows the user to receive the broadcast when there is no convenient signal source other than an antenna, and to tell whether problems receiving a broadcast through an antenna are due to a weak or distorted signal, or due to errors in the format of the digital data. It also helps the user to aim the antenna properly.

Function 4: Record the digital transport stream. This allows the user to capture data for later lab analysis of particularly troublesome problems.

Function 5: Monitor digital properties of a broadcast signal on-line, i.e., as it is being broadcast. This allows the user to detect various kinds of problems automatically as they occur, enabling rapid correction.

Function 6: Analyze digital properties of a broadcast signal off-line, from a recording. This allows the user to drill down into detailed digital properties of a broadcast stream in more detail than might be possible with on-line monitoring alone.

As to Function 3, to monitor the quality of an incoming DTV signal using ATSC vestigial side band (VSB) modulation on-line, i.e., as it is being broadcast, any or all of the following functions can be especially useful.

Function 3.01: Monitor packet error rate for decoding the VSB segments into MPEG-2 packets.

Function 3.02: Monitor signal-to-noise ratio after equalization and phase correction, at the point where the signal goes into the VSB decoder.

Function 3.03: Display snapshots of the tap coefficients and total tap energy from the equalization stage.

Further as to Function 5, to monitor digital properties of an incoming ATSC DTV signal packet multiplex on-line, i.e., as it is being broadcast, any or all of the following functions can be especially useful.

Function 5.01: Analyze the syntax of MPEG-2 transport packets.

Function 5.02: Analyze existence, syntax, consistency, and frequency of MPEG-2 System tables and ATSC PSIP tables.

Function 5.03: Analyze percentage of the transport stream used by various data types, channels, and elementary streams.

Function 5.04: Analyze accuracy, jitter, and transmission frequency of the Program Clock References (PCRs).

Function 5.05: Generate alarms on errors and exceeding specified thresholds.

Function 5.06: Trigger a recording on errors and exceeding specified thresholds.

As to Function 6, off-line analysis of an ATSC broadcast stream includes, but is not limited to, any or all of the Functions 5.01-5.10 and/or any or all of:

Function 6.1: Drill down into the contents of individual MPEG-2 transport packets.

Function 6.2 Present a visualization of the individual MPEG-2 transport packets in the broadcast stream.

Someone who wishes to troubleshoot and/or monitor a DTV signal will desire a monitoring/diagnostic tool that affords maximum convenience and can be obtained at minimum manufacturing cost (and therefore minimum sales price). To achieve such goals, the functions needed for a user's application should be packaged/integrated in an easily portable chassis. This is especially important for field testing, where the instrument may need to be carried on an airplane and in the back of a rental car.

It is a problem that most existing digital television monitoring/diagnostic equipment is oriented toward the lab testing (as opposed to field testing) environment and, moreover, does not contain the right mix of functionalities discussed above, especially not integrated within an easily portable chassis.

SUMMARY OF THE INVENTION

The invention, in part, solves the problems discussed above.

The invention, in part, provides the monitoring/diagnostic functionalities such as those discussed above and packages/integrates them in an easily portable chassis.

The invention, in part, provides an integrated digital television (DTV) diagnostic instrument (and the software embodied therein) comprising: at least one of a video display device (VDD) and an audio display device (AudDD); DTV circuitry (AV) to receive a DTV signal, to reconstruct at least one of a video stream and an audio stream from said DTV signal, and to display at least one of said video stream and said audio stream on said VDD or said AudDD, respectively; and at least one of monitoring circuitry (M), responsive to said DTV circuitry, to monitor digital properties of a live DTV signal and analysis circuitry (AN), responsive to said DTV circuitry, to analyze digital properties of a recorded DTV signal.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIG. 2A is display screen having a plot of the Packet Error Count versus time (msec) and a plot (dB versus msec) of the Carrier to Noise Ratio according to the invention for an example decoded transport stream at the VSB decoder.

FIG. 5 is a display screen having a packet map depiction according to the invention of a transport stream multiplex for another example of a recorded transport stream.

DETAILED DESCRIPTION OF THE PREFERRED EMBODIMENT

Figure 1:
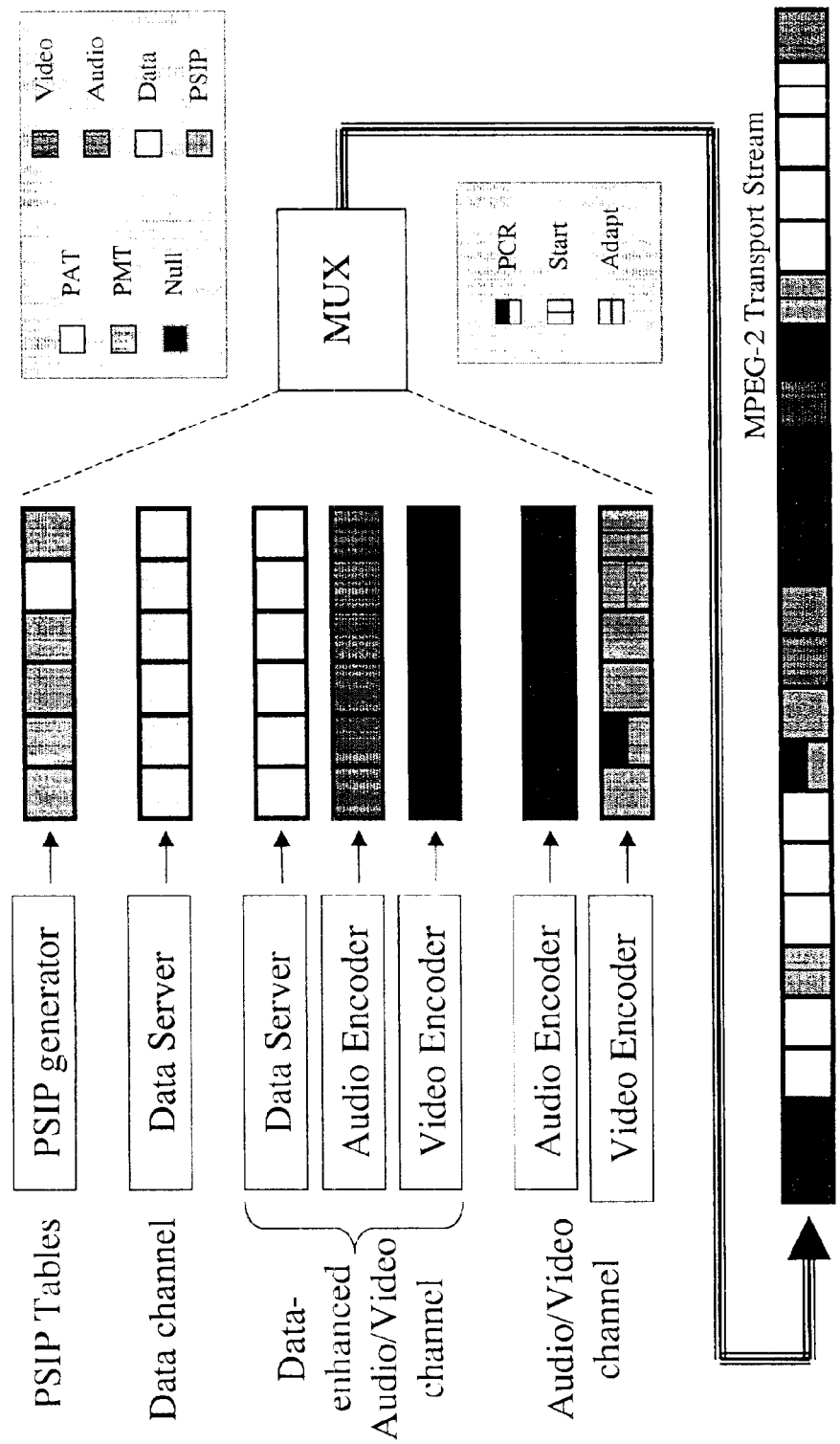
FIG. 1 is a schematic depiction of a ATSC-compliant DTV packet multiplex.
Figure 3A:
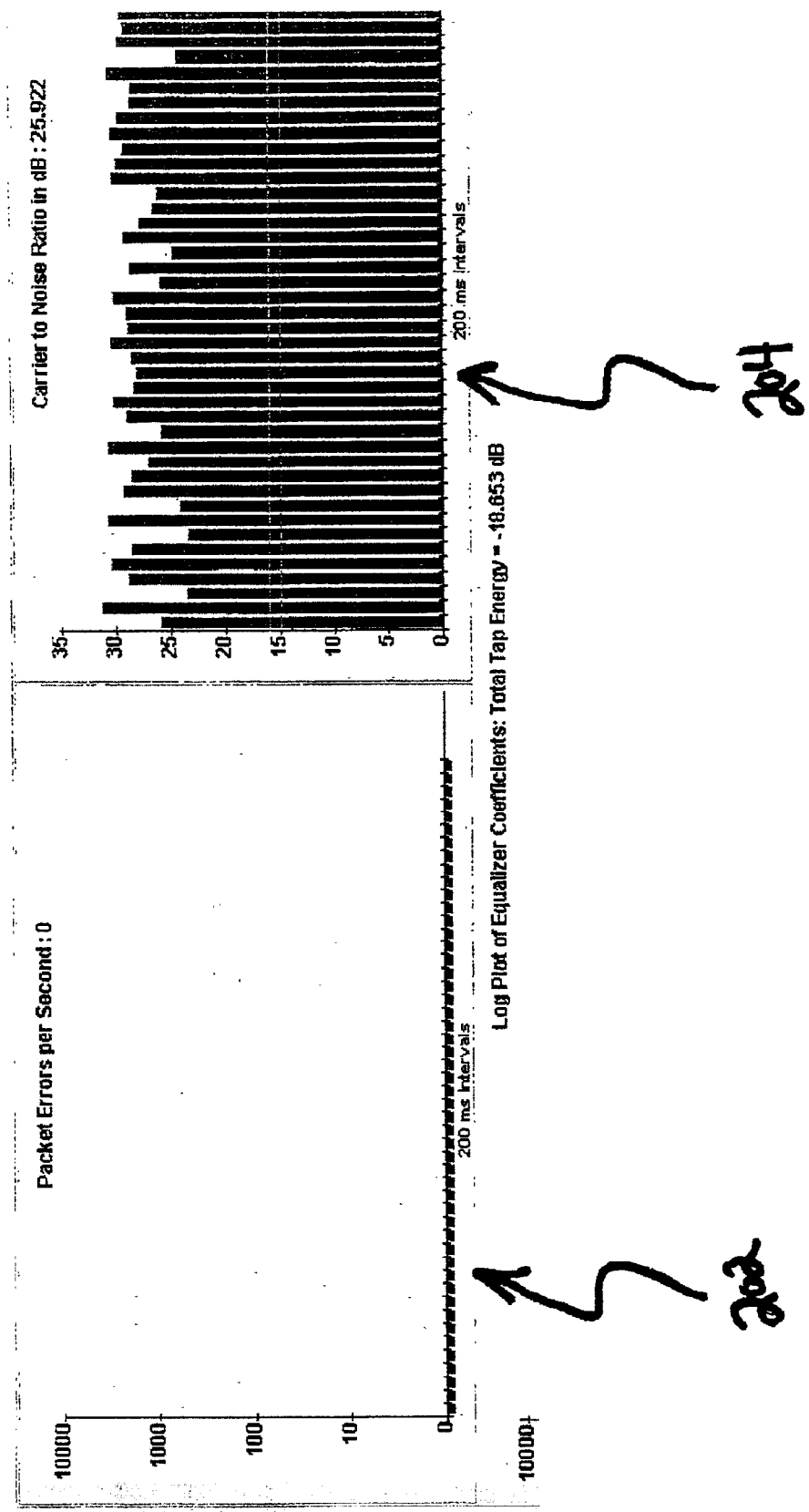
FIG. 3 depicts an example PAT (Program Association Table) pop-up window according to the invention.

The invention, in part, provides the monitoring/diagnostic functionalities and packages/integrates them in an easily portable chassis. A shorthand notation for the functionalities will be described, followed by a discussion of desirable combinations thereof.

Let AV stand for the ability to play digital television audio/video, either from a live broadcast or a digital recording. This can include: monitoring any program in any virtual channel on physical channels 2 through 69, decoding all 18 ATSC video formats, with decoded video displayed in, e.g., 720×480 interleaved resolution; and outputting either 5.1 channel (left, right, center, left rear, right rear, and subwoofer) or stereo pair audio to a speaker. Accordingly, a user can monitor the audio and video signal at a glance (and correspondingly listen). In this way, lip sync problems can be detected easily, a very difficult task with analytical tools alone.

Let VSB stand for the ability to monitor the quality of a digital television signal coming into the instrument from an antenna. This can include displaying, on-line, the following: a graph of carrier to noise ratio; a graph of packet error rate; and a graph of equalizer tap values. Accordingly, a DTV signal can be monitored as it is broadcast over the air, not just at some intermediate stage where problems which crop up in later stages cannot be observed. Also, a technician in the field is freed from dependence on a special tap into the broadcast stream. Just hook the instrument to an antenna, and use it anywhere.

Let R stand for the ability to record a digital television broadcast stream. This can include recording ATSC DTV transport streams to a storage device, e.g., a hard disk drive, from a live broadcast. Accordingly, if broadcast equipment is malfunctioning, the ability to record the transport stream makes it possible to transmit recordings to the equipment vendor(s) in order to demonstrate the problem and help them troubleshoot it rapidly.

Let AN stand for the ability to analyze off-line the digital properties of a recorded digital television broadcast stream. This can include: displaying a color-coded packet map (this functionality is described in more detail in a copending and commonly assigned patent application, Attorney Docket No. 2916-131P, filed, Apr. 11, 2001, entitled "Transport Stream Packet Map Display," the entirety of which is hereby incorporated by reference); drilling down to display detailed packet header and payload contents; displaying program association table (PAT), program map table (PMT), and program clock reference (PCR) frequencies; displaying packet percentages for audio, video, data, program and system information protocol (PSIP), and null packets; displaying MPEG-2 system and ATSC PSIP tables; and drilling down to display detailed table contents.

Let M stand for the ability to monitor the digital properties of a live digital television broadcast stream. This can include: monitoring audio, video, data, PSIP and null packet percentages; monitoring PAT, PMT and PCR frequencies; and monitoring MPEG-2 System and ATSC PSIP tables.

The following specific combinations of functionalities are especially useful for monitoring and diagnosing/troubleshooting at a digital television broadcast station, where non-antenna sources of the broadcast stream are available. Examples of users would be engineers/technicians installing or maintaining digital television broadcast equipment at the station, or station personnel.

Combination 1: AV, AN and R. This allows the user to check that the audio and video are present and can be played, to check that various digital properties of the broadcast stream are correct, and to record the broadcast stream for both local analysis and more extensive analysis by experts back at the home office if necessary.

Combination 2: AV and M. This allows the user to check that the audio and video are present and can be played, and to monitor the broadcast stream continuously for an extended period of time, checking for possible failures or intermittent errors in the digital properties of the broadcast stream.

Combination 3: AV, M and R This allows the user to check that the audio and video are present and can be played, to monitor the broadcast stream continuously for an extended period of time, checking for possible failures or intermittent errors in the digital properties of the broadcast stream, and to record the broadcast stream for more extensive analysis by experts back at the home office if necessary.

Combination 4: AV, M, AN and R—This allows the user to check that the audio and video are present and can be played, to monitor the broadcast stream continuously for an extended period of time, checking for possible failures or intermittent errors in the digital properties of the broadcast stream, to perform more detailed analysis of the digital properties of the broadcast stream, and to record the broadcast stream for more extensive analysis by experts back at the home office if necessary.

The following specific combinations of functionalities are especially useful for monitoring and troubleshooting in the field, where the only digital television signal source may be an antenna, or where it is desirable to check the signal exactly as it appears to a digital television receiver, rather than at some intermediate point prior to final broadcast. Examples of users would be (a) engineers/technicians installing or maintaining digital television broadcast equipment or (b) engineers/technicians installing or maintaining digital television receiving equipment, or (c) station personnel, either at the station or out in the field investigating the station's geographical area of coverage. These combinations provide the same functionality as the corresponding combinations listed above, but with the added ability to monitor the quality of input from an antenna and use this information to position the antenna correctly, and to make sure that the signal is being received without decoding errors.

Combination 5: VSB, AV, AN and R.

Combination 6: VSB, AV and M.

Combination 7: VSB, AV, M and R.

Combination 8: VSB, AV, M, AN and R.

These combinations of functionalities allow DTV broadcast equipment installers/ integrators to: test and troubleshoot installations in the field; monitor picture and sound; check VSB signal quality and multipath problems at different receiving locations; analyze packet percentages, PAT/PMT and PCR frequencies, System and PSIP tables; and record transport streams for more detailed analysis by the engineers back at the lab.

Figure 2B:
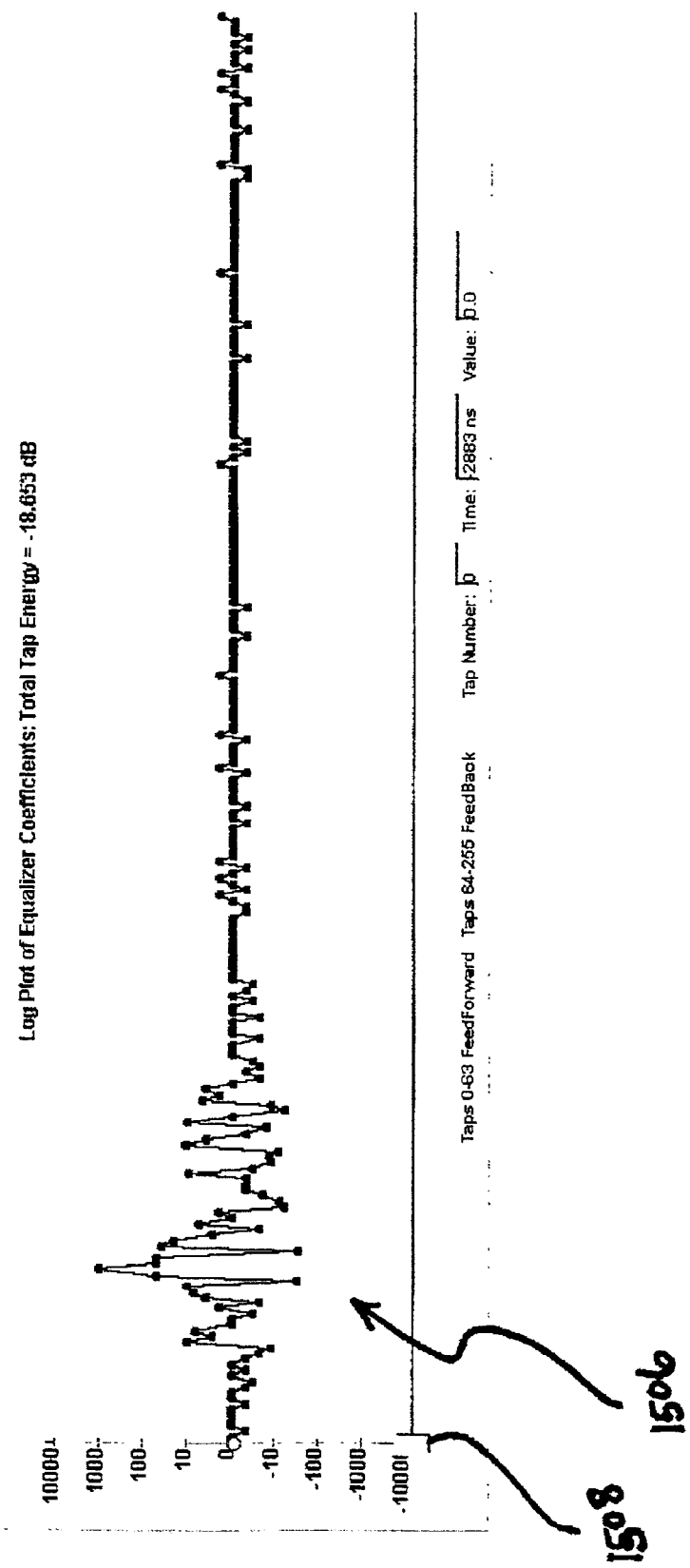
FIG. 2B is a display screen having a plot of equalizer tap coefficients (x-axis) versus total tap energy (y-axis) according to the invention for another example received DTV signal.
Figure 3:
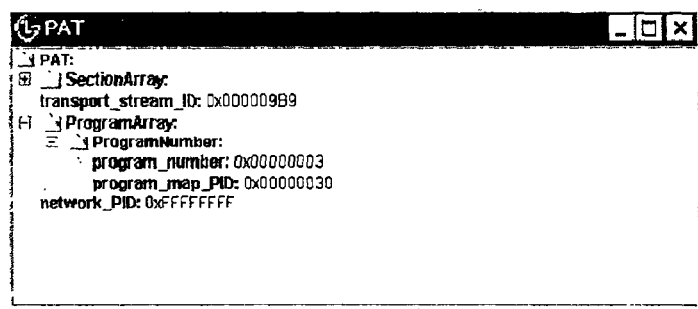

FIGS. 2A and 2B are examples of screens that can be displayed with the VSB functionality. FIG. 2A is a plot 202 of the Packet Error Count versus time (msec) and a plot 204 (dB versus msec) of the Carrier to Noise Ratio of an example decoded transport stream at the VSB decoder. This gives an indication of whether the RF quality of the received signal is adequate for playing, recording and/or analyzing the DTV transport multiplex. FIG. 2B is a plot of equalizer tap coefficients (x-axis) versus total tap energy (y-axis) of another example received DTV signal. This gives an indication of the amount of multipath reflection in the received signal.

Figure 4:
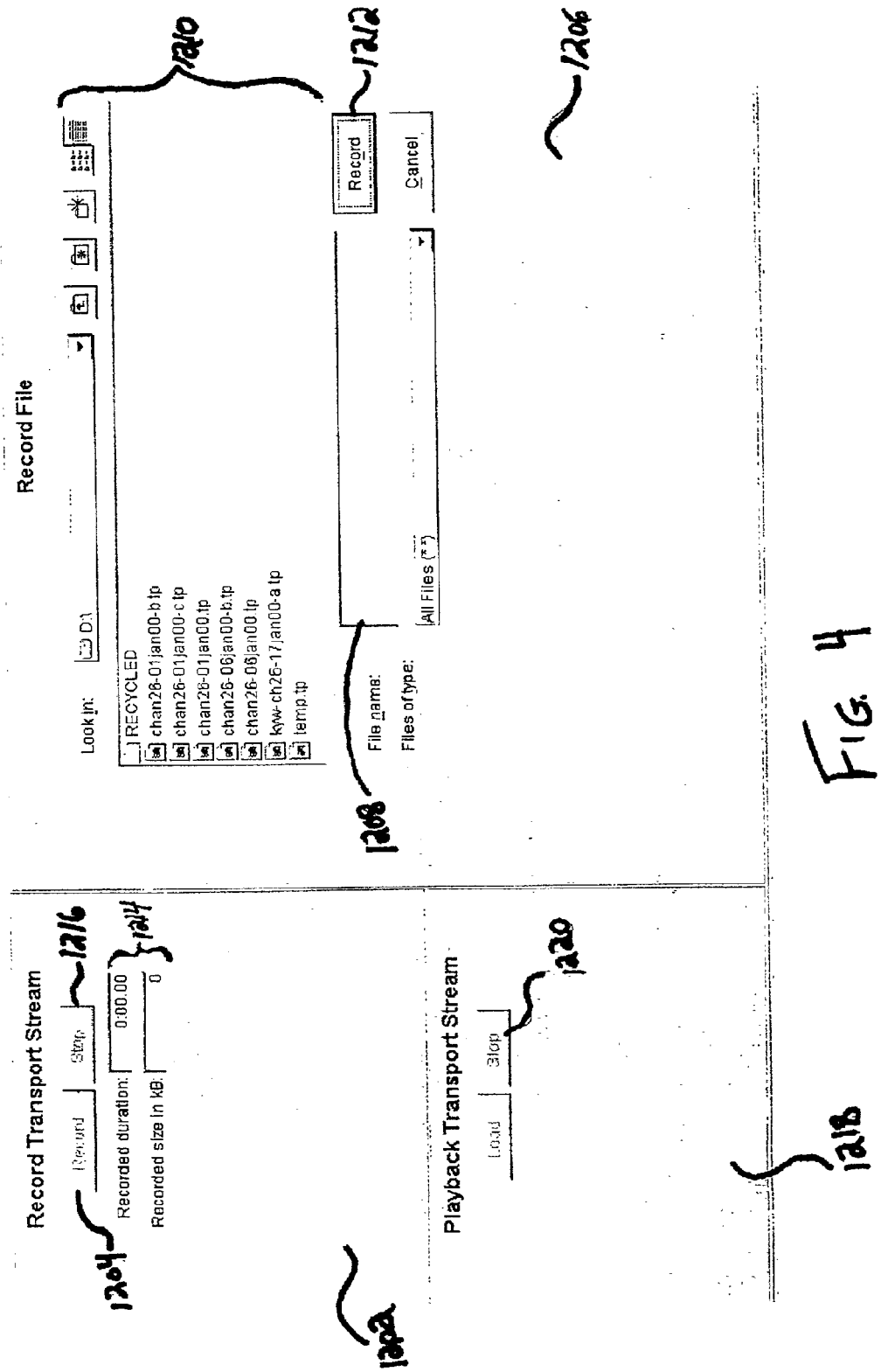
FIG. 4 is display screen having dialog boxes to control recording of a live transport stream portion according to the invention.

FIG. 4 is an example dialog screen that can be displayed with the R functionality. The dialog screen of FIG. 4 is used to effect recording a live transport stream portion to the hard disk, making it available for playback and/or analysis. A very similar dialog (not depicted) can be used to play back a previously recorded stream.

FIG. 5 is an example screen that can be displayed according to the AN functionality. In the screen of FIG. 5, a packet map for another example of a recorded transport stream is depicted. Packets are depicted using a color key to indicate packet type, allowing the user to determine at a glance what types of transport packets are appearing where in the stream. The PSIP tables are continuously updated with the latest data encountered in the stream. Contents of individual packets or tables can be examined by using a pointing device (e.g., a mouse) to click on them. Statistics showing percentages of each packet type are accumulated over the stream and shown near the bottom of the display. The PAT, PMT, and PCR intervals are shown at the lower left.

Figure 6:
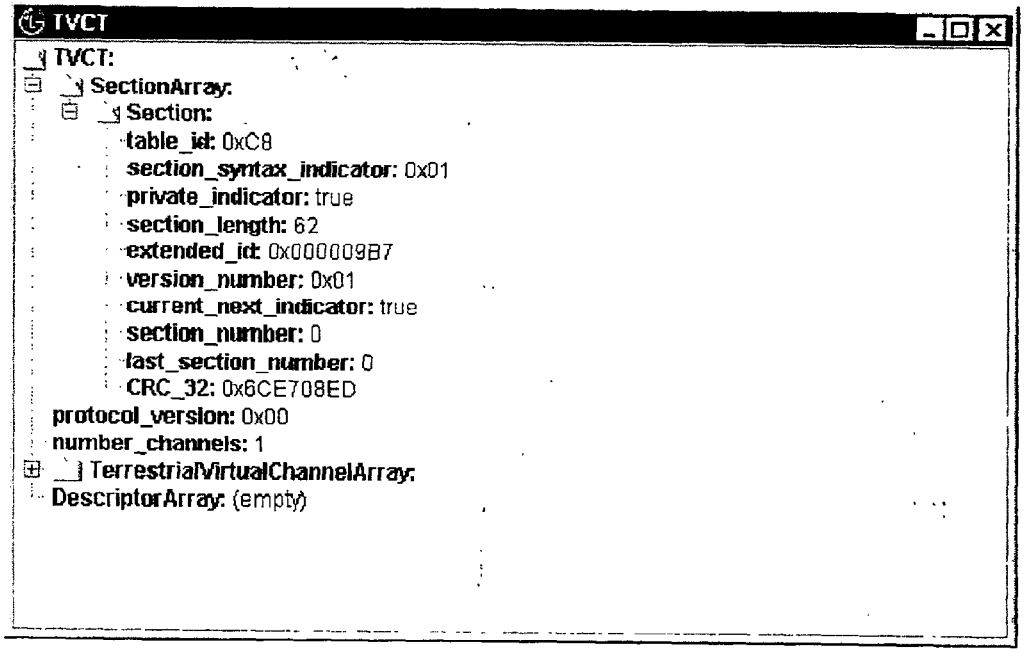
FIG. 6 is a display screen depicting hierarchical contents according to the invention of a virtual channel table (VCT) for another example of a recorded transport stream.

FIG. 6 is an example screen that can be displayed according to the AN functionality. The screen of FIG. 6 shows the contents of the virtual channel table (VCT). It can be obtained by clicking on the appropriate table icon in the list of PSIP tables at the upper right of FIG. 5. The contents are displayed in the form of a hierarchy. More or less detail may be revealed by opening or closing the folder icons representing various elements contained within the table. This allows users to quickly navigate through the data comprising any individual table. Similar displays (not depicted) can be obtained for the system tables (PAT, PMT, CAT (Conditional Access Table), and NIT (Network Information Table)) by clicking on the appropriate table icons in the list of system tables at the lower left, and for the other PSIP tables (MGT (Master Guide Table), STT (System Time Table), RRT (Rating Region Table), EITs (Event Information Tables), ETTs (Extended Text Tables)) by clicking on the appropriate table icons in the list of PSIP tables at the upper right.

Figure 8:
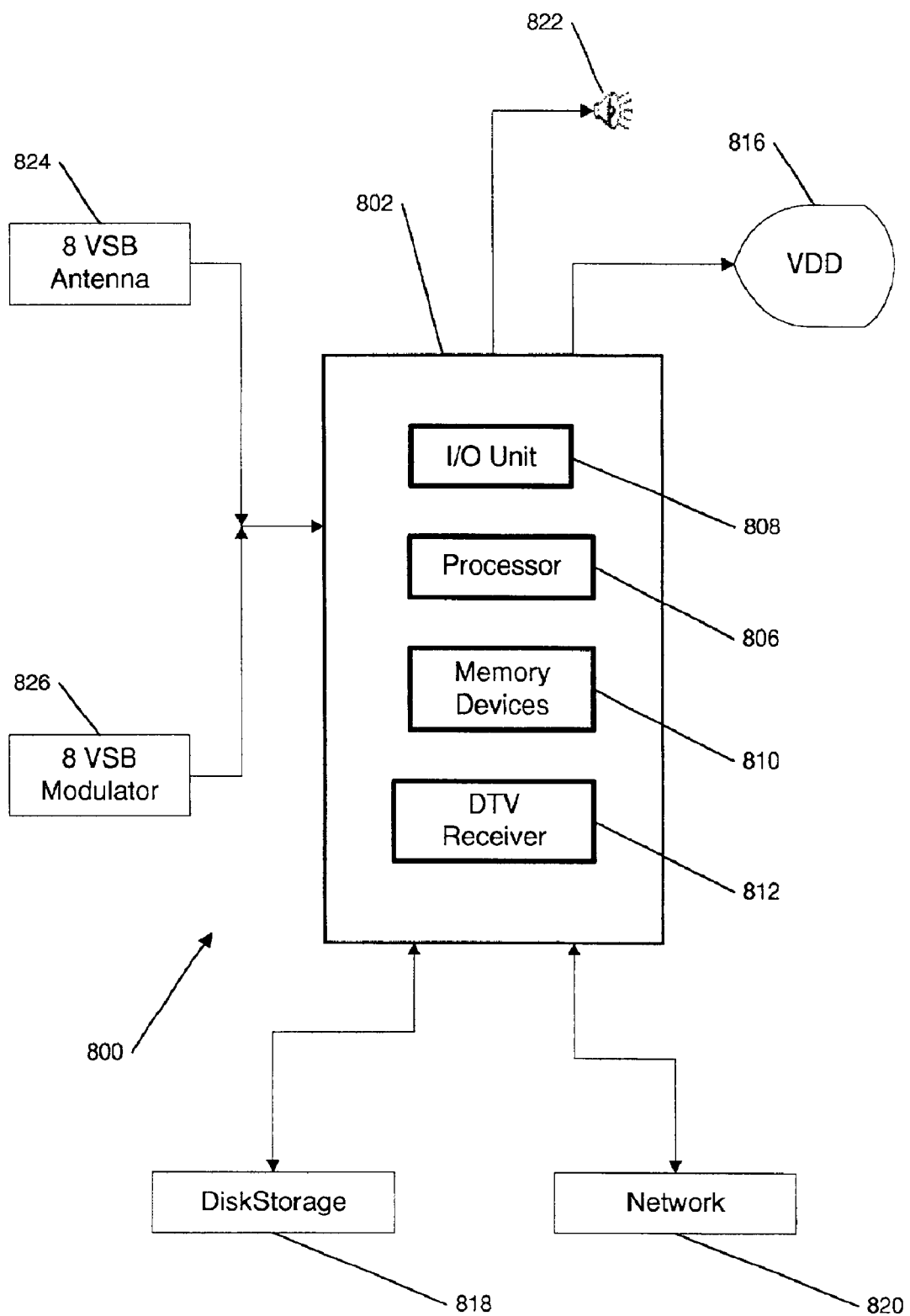
FIG. 8 is a block diagram of a hardware system according to the invention that represents known hardware programmed according to the invention.

An integrated digital television (DTV) diagnostic instrument (and the software embodied therein) according to the invention uses known hardware programmed according to the invention. Such hardware is depicted in FIG. 8. The system 800 of FIG. 8 includes a computer/controller 802 having input/out circuitry 808, a processor 806, one or more memory devices 810 and a DTV receiver 812. The computer 802 is connected to a radio frequency (RF) antenna 824 or other 8 VSB (vestigial side band) signal source 826, e.g., an 8 VSB modulator. The output of the diagnostic instrument is provided to a video display device (VDD) 816 such as a liquid crystal display (LCD) device or cathode ray tube (CRT). Portions of DTV signals (received via the coaxial cable 826) can be saved to or retrieved from a disk storage unit 818 or a network 820 via a connection such as an ethernet connection. The processor 806 can be of the PENTIUM family of processors sold by INTEL INC., e.g., a 450 MHz PENTIUM III processor.

A known computer system with all of the components in FIG. 8 except the DTV receiver 812 and signal sources (antenna 824 and VSB modulator 826) can be obtained from a large number of manufacturers, such as DELL, COMPAQ, IBM, GATEWAY, or HEWLETT-PACKARD.

The DTV receiver 812 can be a DTVCARD A1000 model of personal computer circuit board manufactured and sold by TRIVENI DIGITAL, INC., or a similar card available from a number of other companies such as HAUPPAGE or ACCESSDTV. Such a card can plug into the aforementioned computer systems. Examples of portable computers with expansions slots to accommodate the DTV A1000 card (among others) are the PAC series of rugged portable computers, e.g., the FLEXPAC and the LPAC, manufactured by DOLCH COMPUTER SYSTEMS, INC.

A suitable 8 VSB antenna 284 is available from many sources, for example RADIO SHACK.

The computer 802 can run under the WINDOWS 98 operating system manufactured and sold by the MICROSOFT CORPORATION in the case where the DTV A1000 card is employed as the DTV receiver 812. The same or another version of the WINDOWS operating system may be used with other cards, depending on what operating system is supported by the device drivers from the card manufacturer. The software running on the Processor 806 can command the DTV receiver 812 to tune to a specified physical channel and to render the audio and video from specified streams in that channel's packet multiplex, identified by specified PIDs. The software can also command the DTV receiver 812 to make available to the Processor 806 all of the individual data packets in the packet multiplex.

Figure 9:
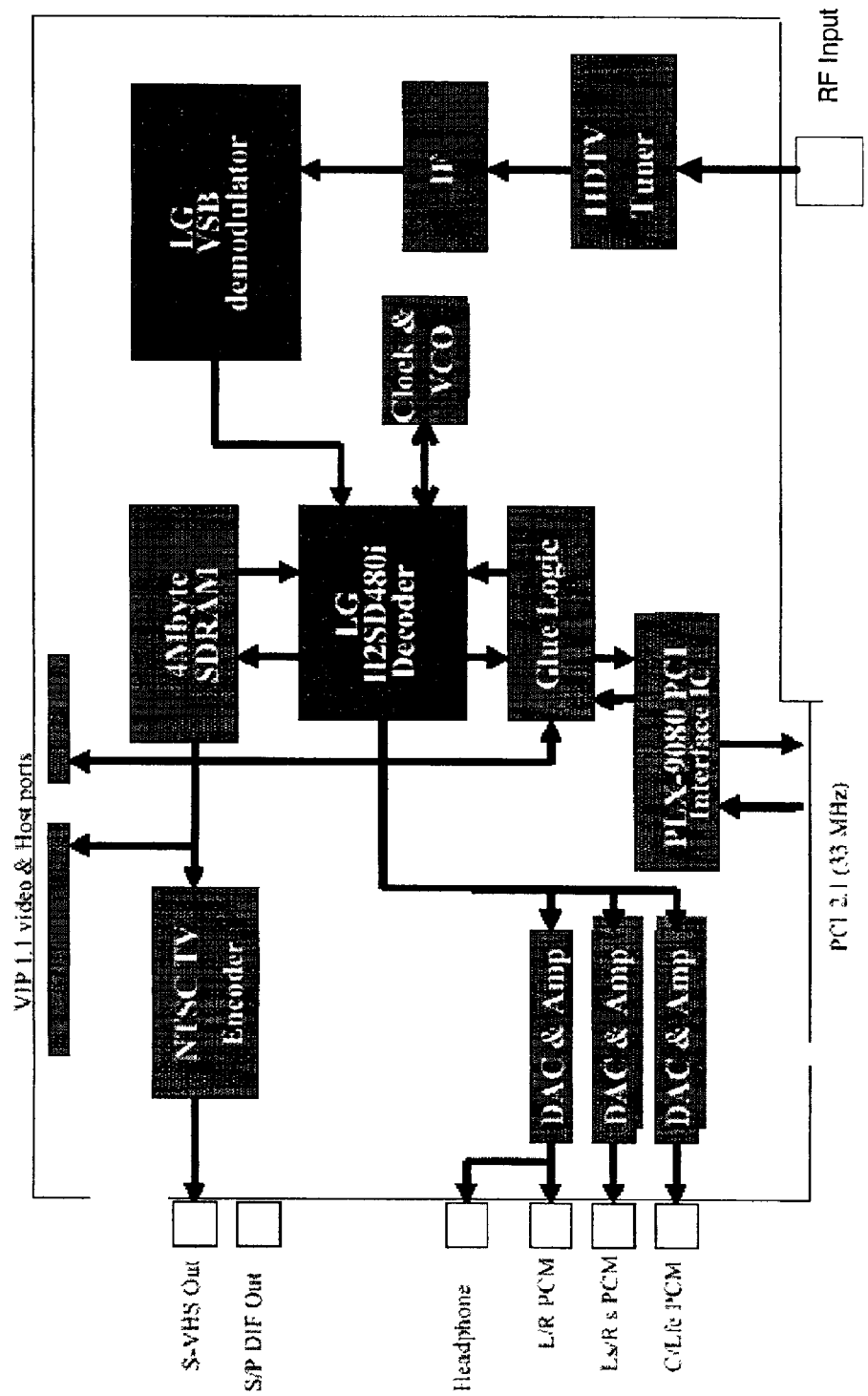
FIG. 9 is a schematic block diagram of a DTV receiver that can be used to embody, in part, the invention.

A schematic block diagram of the DTV receiver 812 is depicted in FIG. 9. The DTV receiver 812 includes an RF input port to receive incoming DTV signals from terrestrial broadcasting stations. A known HDTV tuner can be used to select the specified channel and extract the intermediate frequency (IF) 8 VSB signal from the RF carrier. The packet multiplex can be extracted from the IF signal with a single chip LG VSB demodulator available from LG ELECTRONICS. The data packets containing the specified audio and video streams can be separated out and fed to an LG H2SD480i decoder for audio/video decoding. The decoded audio and video can be sent to the I/O Unit 808, which outputs them for playing on the speakers 822 and displaying on the VDD 816. At the same time, all of the data packets in the packet multiplex can be made available to the Processor 806 through a PLX-9080 PCI Interface IC.

When implemented by the DTVCARD A1000 model of circuit board, the DTV receiver 812 can: receive an RF signal from an antenna or other source via a 75 ohm co-axial cable connector; perform 8 VSB demodulation; decode all 18 ATSC video formats; down-convert video to CCIR601 (Consultative Committee on International Radio standard 601) resolution; decode the DOLBY AC-3, Pro-Logic, 3-D virtual surround audio format and Dolby AC-3 dual audio service; support downloading of a received Transport Stream multiplex through a PCI bus while viewing a corresponding image on the VDD 816 and listening to corresponding sound on the speakers 822 for selected PID streams; support uploading encoded streams through a PCI bus; produce video outputs including S-VHS and composite output for an NTSC TV, and CCIR656 video output for PC; provide a graphics card interface; provide audio outputs including 5.1 channel output for speakers, stereo output for headphone and S/P DIF (Sony/Philips Digital Interface) digital audio output.

The operation of the monitoring/diagnostic device according to the invention will now be discussed in more detail. First, the overall organization of the software program running on the Processor 806 is described. Then the individual features of the instrument and their software implementations are described.

The software program can be written in the Java programming language, using well known Java library packages to simplify many programming tasks, such as implementation of the user interface. The user interface can be based on known graphical user interface technology, taking advantage of mouse, keyboard and VDD 816.

The software program can be multi-threaded. A control thread can handle interactions with the user. An analysis thread can handle the different types of processing that take place when the instrument is monitoring or analyzing a packet multiplex. A VSB monitoring thread can poll the DTV receiver card 812 periodically to monitor the characteristics of the VSB input signal.

The software program can include a Java Native Interface (JNI) DTVdriver class to provide Java access to the device drivers for the DTV receiver card 812, since the functionality of this card is not accessible through the usual Java library packages. Implementation of this class is very straightforward using well known techniques, once information about the Application Programming Interface (API) of the DTV device driver is provided by the card manufacturer. (This is usually a C language programming interface.)

The instrument can get a transport stream packet multiplex from either of two sources: VSB signal or file. It can get a VSB input signal via the RF input to the DTV receiver card 812. The card can tune to a specified physical channel, demodulate the packet multiplex, and render the audio and video streams that are in specified PIDs of the packet multiplex, as directed by the Processor 806, and it can provide all the data packets in the packet multiplex to the Processor 806 via Direct Memory Access (DMA) transfer to memory. It gets file input by having the Processor 806 read the packet multiplex into memory from a disk file. The DTV receiver card 812 can then get it from memory via DMA transfer and render the audio and video in specified PIDs.

The Processor 806 can also access the packet multiplex in memory for analysis.

Live packet multiplex inputs from non-VSB sources, such as signals in DVB ASI or SMPTE 310 format coming directly from an encoder or multiplexer, can be accommodated within the scope of this invention by plugging into the PC a suitable input card (e.g., a DVB ASI input card or SMPTE 310 input card, available from a vendor such as VIEWGRAPHICS). The Processor 806 can read the packet multiplex into memory from the input card. The DTV receiver card 812 can then get it from memory via DMA transfer and render the audio and video in specified PIDs. The Processor 806 can also access the packet multiplex in memory for analysis.

The instrument can operate in any one of four display modes: Video View, VSB View, Record/Play, and Stream Analysis. Video View is used for viewing a video program. VSB View is used for viewing the characteristics of a VSB signal. Record/Play is used to control recording and playback of a packet multiplex. Stream Analysis is used for viewing the results of monitoring and analysis of a packet multiplex.

The defaults at startup of the instrument can be VSB input and Video View.

Figure 10:
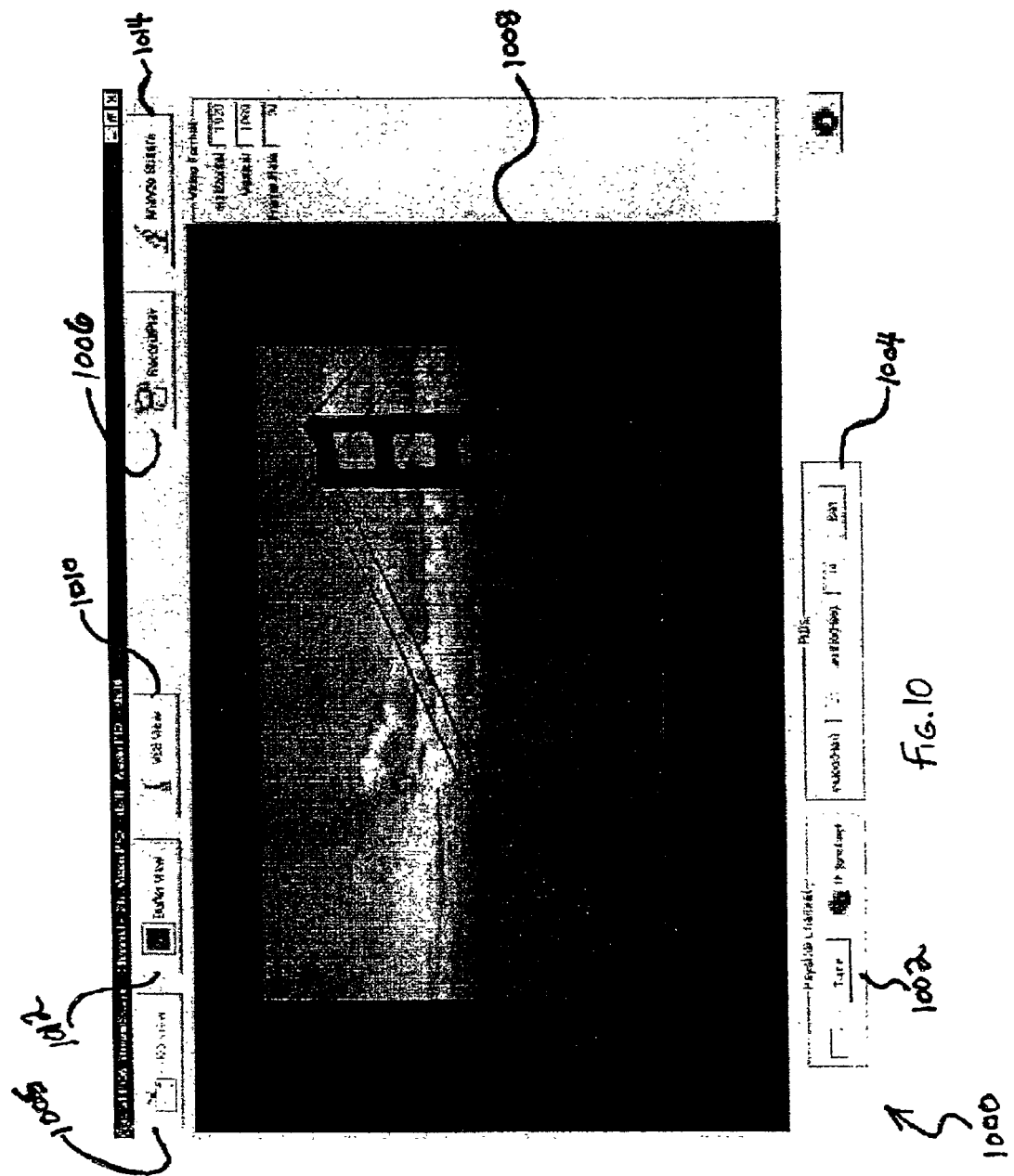
FIG. 10 is a video view screen according to the invention.

Within the AV functionality, a default mode of operation upon starting a monitoring/diagnostic device according to the invention can be the video view screen, like the screen 1000 depicted in FIG. 10, using a live signal from the RF input port. This video view can also be activated by clicking the Video View button 1005. An example implementation of the monitoring/diagnostic device according to the invention would render the audio and video from the same physical channel and the same audio and video packet identifiers (PIDs) that were set when the system was last shut down as a default upon startup.

Upon startup, the control thread sets up the screen as depicted in FIG. 10, then commands the DTV receiver card 812 to tune to the specified physical channel and render the audio and video from the specified PIDs, giving the DTV receiver card 812 the position on the VDD that should be used for the video display. The DTV receiver card 812 then starts sending the decoded audio and video directly to the I/O Unit, to be passed on to the speakers 822 and the VDD 816 without going through the Processor 806. The control thread also starts up the VSB monitoring thread and the analysis thread. The analysis thread commands the card to start sending the data packets from the transport multiplex via Direct Memory Access (DMA) to a buffer area in the computer memory where they can be accessed for analysis.

The physical channel and audio and video packet identifiers(s) can be set via Physical Channel dialog box 1002 and PID dialog box 1004. Here, a physical channel is understood to be a generic term to refer to the each of the 6–8 MHz frequency bands where television signals are embedded for transmission. It is also known as the physical transmission channel (PTC). One analog virtual channel fits in one PTC but multiple digital virtual channels typically coexist in one PTC. Also, a digital virtual channel can include a collection of related streams, such as a single video stream and one or more associated audio streams.

Figure 11:
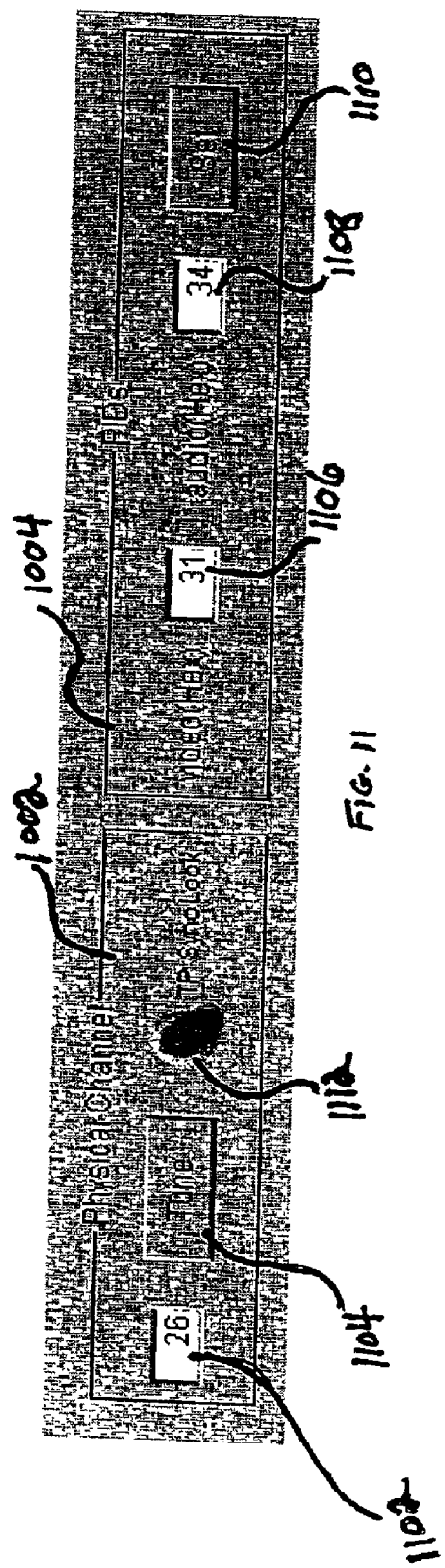
FIG. 11 depicts a Physical Channel dialog box 1002 and a PID dialog box 1004 according to the invention.

The Physical Channel dialog box 1002 and PID dialog box 1004 can be located, e.g., at the bottom of FIG. 10, and can be seen in more detail in FIG. 11. To change the physical channel, simply type the new channel number, e.g., 26, in the Physical Channel field 1102 and either click the Tune button 1104 or press Enter on the keyboard (not depicted).

To change the audio and video PIDs, type the PID value of interest (e.g., using hexadecimal notation) in the video field 1106 and the audio field 1108, then either click on the Set button 1110 or press Enter on the keyboard (not depicted). The control thread in the software program receives these commands and gives corresponding commands to the DTV receiver card 812. If the instrument is getting input from a file, the physical channel selection is inoperative; only the PIDs can be selected.

The TP SyncLock indicator 1112 within the Physical Channel box 1002 can display whether the monitoring/diagnostic device has obtained VSB synchronization (sync) lock with the tuned physical channel. If sync lock has been obtained, the indicator 1112 can turn green, otherwise, the indicator 1112 can turn red. This light only operates when the instrument is in getting VSB input.

This light is maintained by the monitoring thread. It simply polls the DTV receiver card 812 for synchronization status via the JNI interface at regular intervals, perhaps every 200 milliseconds, and turns the light green or red depending on the response it receives. This light indicates whether the tuner is locked in on the pilot frequency of the RF signal, not whether the VSB demodulator is able to extract the transport packets successfully.

An elementary stream is an ordered series of bytes extracted from Transport Stream packet payloads which have a common unique packet identifier (PID) value (e.g., video packetized elementary stream (PES) packets or Program Map Table sections).

Setting different audio and video PIDs allows view different programs in the transport stream to be viewed when multiple programs are present.

A program can be a collection of program elements. Program elements may be elementary streams or other data streams that may be included in a program, for example: audio, video, data, etc. Program elements need not have any defined time base. Those that do have a common time base are intended for synchronized presentation. The term program is also commonly used in the context of a "television program" such as a scheduled daily news broadcast. In this description, the term "event" is used to refer to a "television program" to avoid ambiguity.

If the TP SyncLock indicator 1112 is green but the audio is absent or video is not displaying correctly, the PID values may not be set correctly. Alternatively, the signal may be weak or noisy, or the antenna may be aimed incorrectly, so that the DTV receiver 812 cannot extract the packet multiplex correctly.

Antenna 824 positioning can be important to extract the packet multiplex correctly. The user can use the VSB monitoring feature (the VSB functionality) to ensure that the Packet Error Count is stable at zero, and that the Carrier to Noise ratio is greater than 16 db. This can provide a usable signal for the monitoring/diagnostic device system.

Figure 12:
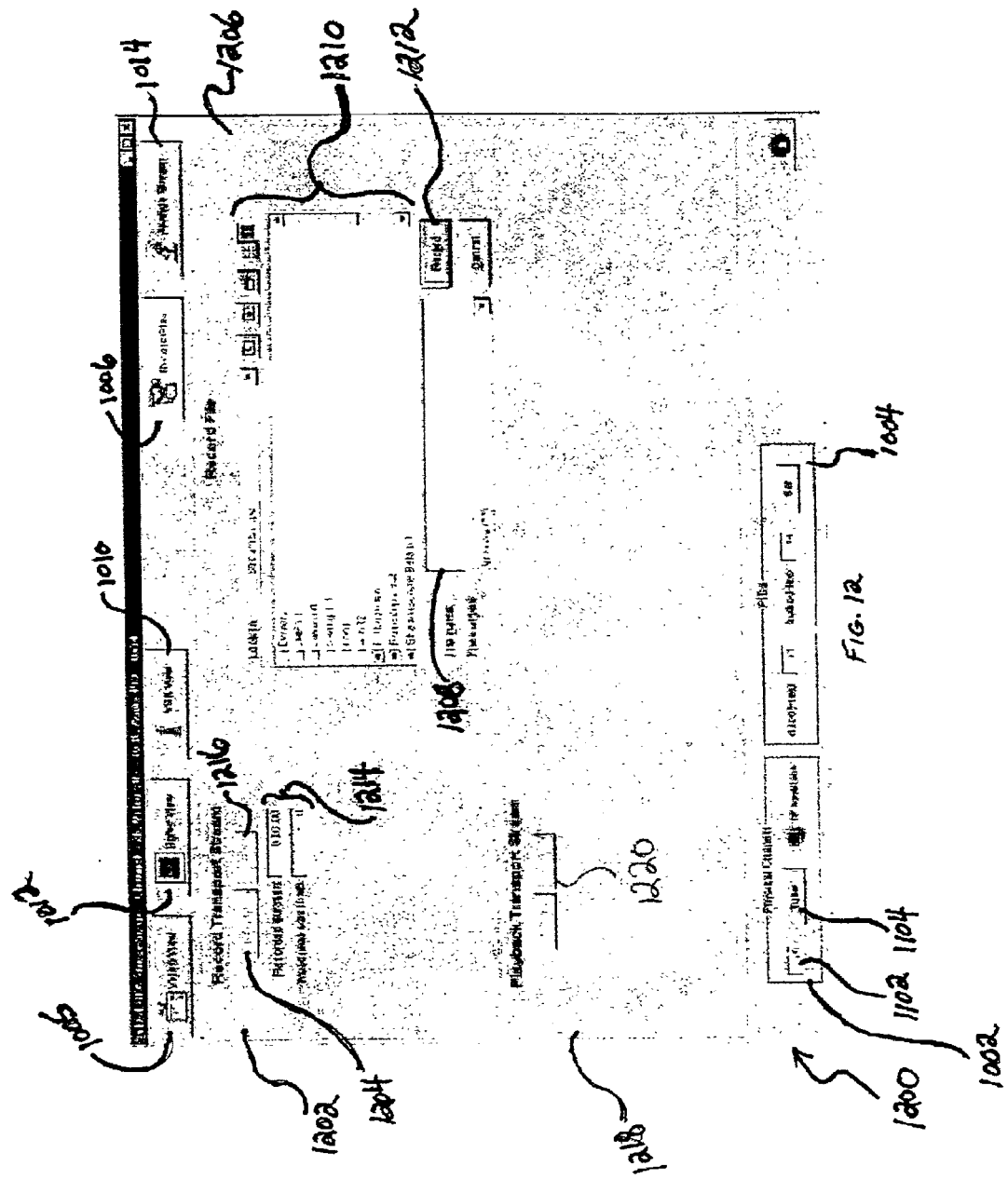
FIG. 12 depicts a Record/Playback window (in recording mode) according to the invention.

Within the R functionality, programs can be recorded to the disk storage 818 for either playback or analysis. Recording can be accomplished by clicking the Record/Play button 1006 of FIG. 10, causing a Record/Playback window, such as 1200 FIG. 12, to be displayed. In more detail, the user tunes to the channel of interest by typing the number of the channel into the Physical Channel field 1102 and clicking the Tune button 1104. Note that it is not necessary to select particular PIDS via the PID dialog box 1004 in this instance, since the entire transport stream is recorded, including all available programs and system information. Next, click on the Record button 1204 in the Record Transport Stream portion 1202. A File Chooser dialog box 1206 appears, as shown in FIG. 12. The initial directory can be the last directory visited in this view, or a default directory when the application is first launched.

Next enter a new file name in the file name field, or pick an old file name to overwrite an existing file using the directory listing dialog box 1210. After a filename has been entered, click on the Record button 1212 in the File Chooser dialog box 1206. Recording can begin immediately. Immediate recording can be evidenced by an advancing counter 1214 indicating the current recording size in seconds and kBytes. Ending the recording can be done by simply clicking on the Stop button 1216 in the Record Transport Stream portion 1202.

Well known Java packages can be used to implement this File Chooser dialog box without difficulty. When the user asks for recording to begin, the control thread opens the specified file and starts up a recording thread to write into the file the packet multiplex bytes coming into memory from the DTV receiver 812. When the user asks for recording to stop, the control thread notifies the recording thread to stop writing to the file and close it (using standard Java inter-thread communication mechanisms). The recording thread does so and then terminates. The software to display the counter showing the number of bytes written and the corresponding playing time (using the standard ATSC data rate of 19.38 megabits per second) is a straightforward software development task.

Figure 13:
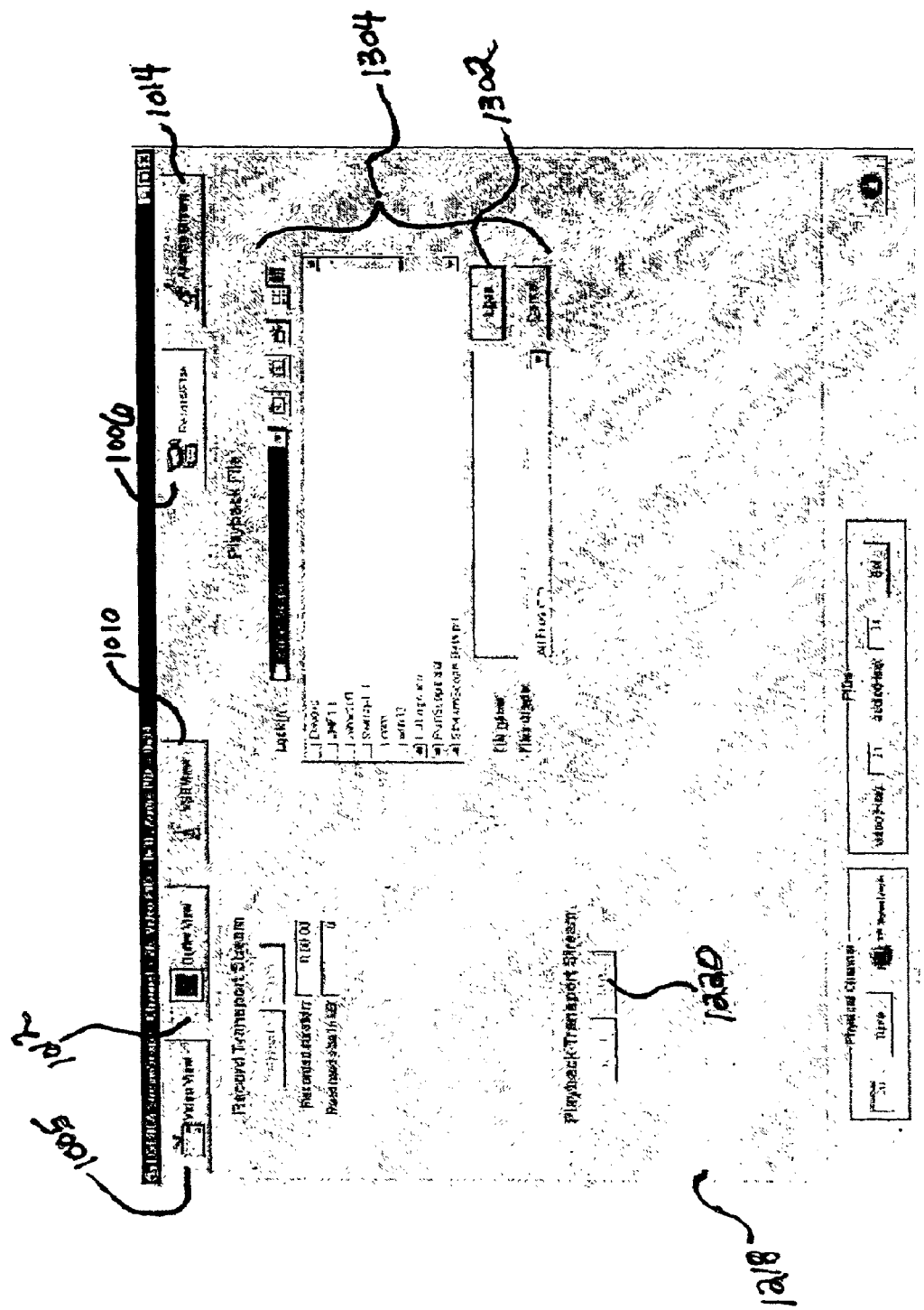
FIG. 13 depicts a Record/Playback window (in playback mode) according to the invention.
Figure 14:
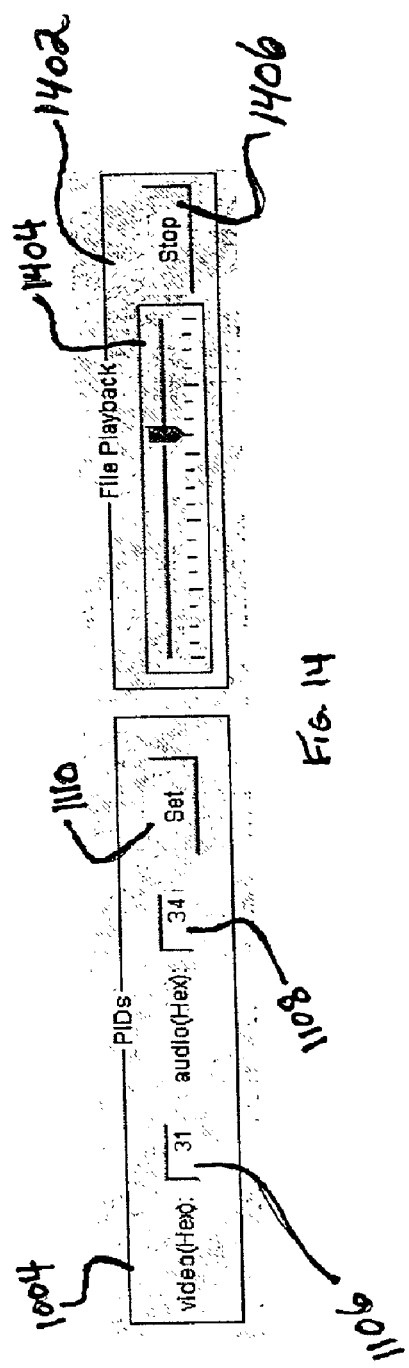
FIG. 14 depicts a Playback Progress indicator portion of a display screen according to the invention.

Also, within the R functionality, programs previously recorded to disk may be selected for playback. This can be done by selecting the Record/Playback View (clicking on button 1006 of FIG. 10) and clicking on the Load button 1302, which is part of a File Chooser dialog box 1304 of FIG. 13. Next a file can be selected via the File Chooser dialog box 1304, which can open to the last directory used in this view. A file can be selected and the Load button 1302 can be clicked on. Playback starts, as can be evidenced by an advancing slider in the Playback Progress indicator portion 1402 of FIG. 14. The system 800 can automatically switch to the Video View (such as depicted in portion 1008 of FIG. 10) so file playback can be viewed.

When the user selects the file and indicates that playback should begin, the control thread of the program can start up a playback thread to continuously read data from the file into memory and command the DTV receiver card 812 to take the data from memory and play it. When the end of the file is reached, the playback thread can close the file and terminate. Alternatively, the user may indicate that playback should stop before the end of file is reached. If that happens, the control thread can notify the playback thread, which can close the file and terminate.

To stop playback, the user can click the Stop button 1220 in the Playback Transport Stream portion 1218 of the Record/Play View or click the Stop button 1406 next to the File Playback slider 1404 in the Video View. Upon stopping playback, the system can returns to the live broadcast feed and can attempt to tune to the last known Physical Channel and PIDs.

The Video View 1008 can be used when viewing playback of recorded files. In this case, in addition to the Physical Channel and PID dialog boxes 1002 1004, a slider 1404 can appear to indicate file playback (see FIG. 2.5). Also, the physical channel dialog box 1002 can be inactive since playback from a file is unaffected by channel tuning. The PID selection can still be active. Note that while playing from disk, it is not necessary for a valid channel to be tuned.

The Tune button 1104 and the field 1102 in the Physical Channel dialog box 1002 can be disabled. The PID values, however, remain important since the complete stream was recorded. The correct PIDs for the desired program in the recorded stream are still needed to view the program.

During playback, the video and audio are rendered and displayed for the user. The monitoring/diagnostic device can advance through the transport stream, indicating the progress by advancing the slider 1404 from left to right in the Playback Progress portion 1402. Upon reaching the end of the transport stream, the monitoring/diagnostic device can stop playback and wait for the user to click the Stop button 1406. The monitoring/diagnostic device can then return to showing live video.

Implementation of the slider and the stop button is a straightforward software development task.

Figure 15:
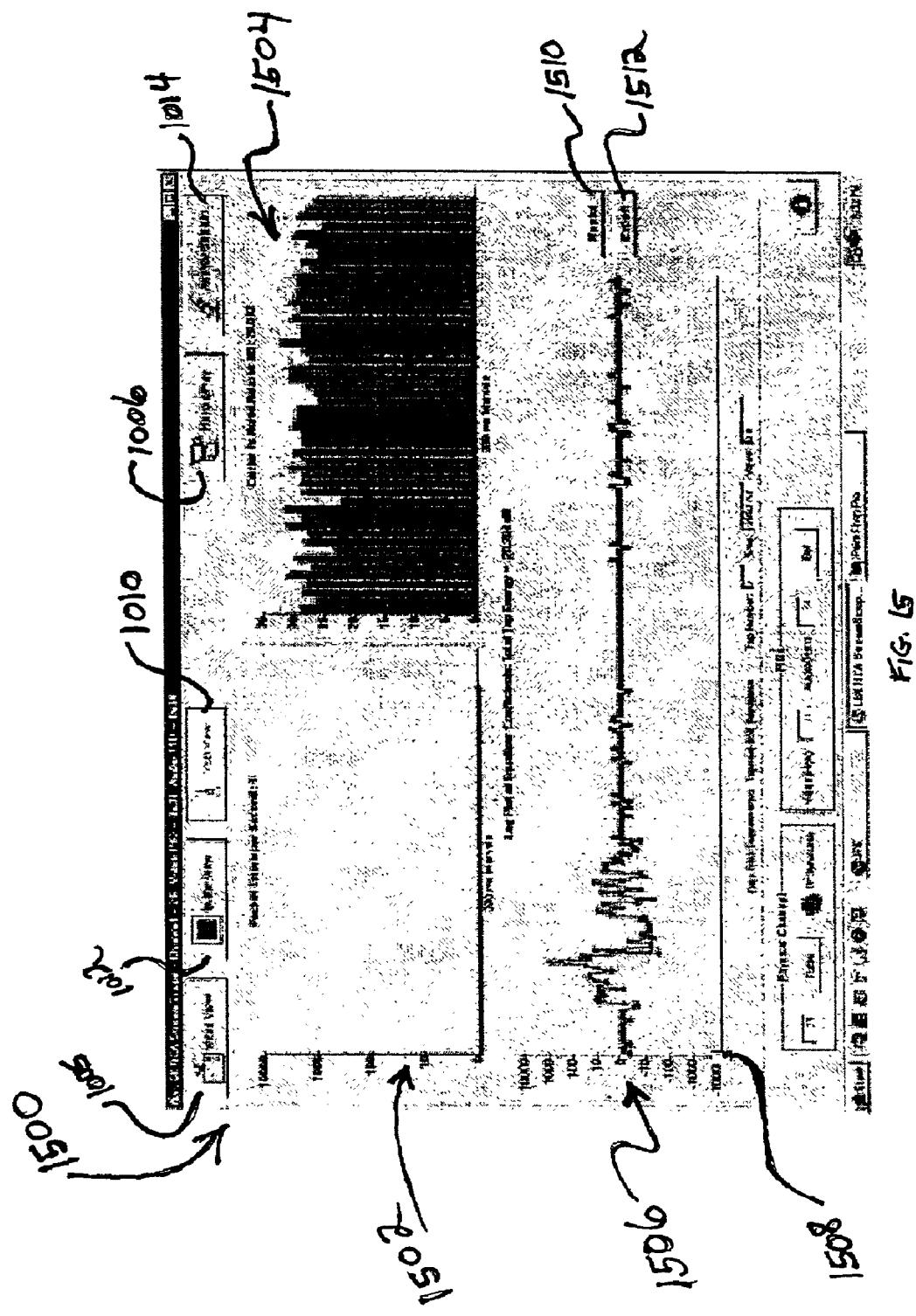
FIG. 15 depicts a VSB view and graphs that can be displayed within it according to the invention.

The VSB Monitoring functionality can be selected by clicking the VSB View button 1010, causing the VSB view screen 1500 to be displayed. This view displays graphs that monitor VSB properties, including Packet Error Counts, Carrier to Noise Radio, and Equalizer Coefficients. Note that monitoring VSB properties requires tuning to a channel, but does not require correct selection of PID values. FIG. 15 depicts a VSB view and graphs that can be displayed within it.

To monitor a transmitted transport stream, the VSB receiver 812 can go through the following steps: 1. Tune to the RF frequency containing the signal. 2. Extract the intermediate frequency (IF) VSB signal from the carrier. 3. Put the VSB signal through an autoranging A/D converter. 4. Apply equalization to remove multipath reflections. 5. Apply phase correction. 6. Decode the VSB signal to extract the moving picture experts group (MPEG) transport packets.

The Packet Error Count graph 1502 (similar to plot 202 of FIG. 2A) shows the packet error rate computed by the VSB receiver 812. A running count of packet errors per second can be maintained by the receiver 812, using a suitable window for the running count, perhaps two seconds or so, and this value can be sampled by the VSB monitoring thread of the software program and displayed every 200 milliseconds.

As part of the VSB encoding, packets from the broadcaster are supplemented with redundant forward error correction information that may be used to find and correct certain errors. During transmission, the VSB signal may be corrupted by electrical noise in the environment or multipath interference. The DTV receiver 812 is responsible for identifying corruption in the packets and then applying error correction in an attempt to recover as much of each original transport stream packet as is possible.

In some situations, the corruption of the signal may be so great that the receiver is unable to correct all the packets, so some packets are dropped. It is these packets that are counted in the Error Count. The errors can be detected after all error correction has been applied, and can reflect the absolute number of packets with uncorrectable errors. This value should be expected to remain at zero for a clean signal. The bars of zero height can be colored green on the display to indicate that the signal is good. Packet errors can be shown in red.

The Carrier-to-Noise Ratio graph 1504 (similar to plot 204 of FIG. 2A), that can be displayed by the monitoring/diagnostic device, can be computed on the signal after it has already been digitized via an Analog/Digital (A/D) converter in the DDTV receiver card (not depicted) and after it has gone through equalization and phase compensation stages (all part of the VSB demodulation chip on the card). That is, it is not the analog carrier-to-noise ratio as it appears over the air. Rather, it is the ratio as it appears to the internal circuitry that performs the VSB decoding and extracts the transport packets, after certain steps have been taken to remove noise from the signal.

The LG VSB Demodulator chip used in the DTV receiver 812 of the monitoring/diagnostic device can compare the received field sync segment with an error-free reference pattern for a field sync segment and use the difference to estimate the noise level of the signal. The estimated value can be stored in a register on the chip.

Since VSB decoding starts with randomizing the input data, the average power level of a VSB signal is essentially constant over any segment. The average power level of a VSB signal may vary with time, but not at the time scale of a segment. Also, different VSB signals may have different average power levels as they appear over the air, but they can be amplified/attenuated to a standard level before going into the A/D converter (which is what an autoranging A/D converter does). Thus, the VSB monitoring thread of the software program can compute the carrier-to-noise ratio by taking the standard average power level of the signal and dividing by the noise level (which was computed from the field sync segment and read from the DTV receiver card via the Java JNI interface).

Computing the carrier-to-noise ratio at this stage in this way has the advantage that it measures how well the VSB decoder 812 will be able to decode packets. As the ratio rises above 15, the probability of packet errors rapidly decreases. As the ratio drops below 15, the probability of packet errors rapidly increases. See the Zenith publication "ATSC/VSB Tutorial—Receiver Technology", for a graph of the packet error probability vs. the S/N ratio.

The carrier to noise ratio can be recomputed by the monitoring/diagnostic device every 24.2 milliseconds (every time a new sync segment arrives). And the monitoring/diagnostic device can read the ratio at suitable intervals, perhaps every two hundred milliseconds, and graph the values it reads.

The Equalizer functionality of the DTV receiver 812 attempts to minimize signal degradation caused by multipath interference at the receiver. The Equalizer Coefficient graph 1506 (similar to the plot in FIG. 2B) can show the coefficients used for each feedforward and feedback tap in the VSB Equalizer subsystem, graphed on a logarithmic scale.

Multipath interference results when a signal from a transmitter to a receiver takes more than one path. For instance, one path from the transmitter to the receiver might be a direct line of sight, and would be the shortest path available. Another path might include the signal reflecting off of a nearby building, and this longer path would result in the signal arriving at the receiver some fraction of a second later. It is important for the receiver to be able to resolve the original signal from the signal corrupted by multipath effects.

The correction for multipath reflection can be accomplished by taking the received signal for a sync segment, comparing with the known correct signal for a sync segment, and using well known regression analysis techniques to compute the tap coefficients for a well known tap filter model which cancels out the echoes. The Equalizer of the DTV receiver card 812 can use 256 taps. The first 64 taps can be feedforward taps (feeding in time-offset multiples of the input to the Equalizer), and the last 192 taps can be feedback taps (feeding in time-offset multiples of the output from the Equalizer). The time offset between taps can be 93 nanoseconds. Tap 31 can be the center tap, containing the input signal at 0 time offset. (This is actually the 32nd tap, since the tap numbering starts with 0.) The tap coefficients (multipliers) can be computed by regression analysis so that the filter comes as close as possible to recovering the original transmitted signal.

The control thread of the software program can read all of the tap coefficients from the DTV receiver card 812 at appropriate times via the JNI programming interface, and display a graph of the coefficients, as shown in FIG. 2B.

The total energy of the signals fed through the taps can be displayed at the top of the graph. It can be expressed in decibels, relative to the energy of the input signal. The smaller the number, the more multipath interference in the original signal. The software program can compute it by taking the square root of the sum of the squares of all the tap coefficients, excluding the center tap, and dividing by the square root of the sum of the squares of all the tap coefficients, including the center tap. This ratio can then be expressed in decibels, using the well known definition of decibels.

The control thread can display the time offset and value of any tap coefficient when the user moves the vertical line cursor with the slider 1508 or with right/left arrow keys on the keyboard (not depicted).

There can be two buttons next to the Log Plot of Equalizer Coefficients graph 1506, a Replot button 1510 and an Export button 1512. During normal operation of the monitoring/diagnostic device, the Equalizer coefficients used for VSB decoding can be continuously updated at every VSB packet, approximately every 24.2 milliseconds. However, e.g., the Log Plot 1506 of Equalizer Coefficients may not be continuously updated. It can be updated only, e.g., when the VSB View screen 1500 is entered, or the channel is changed, or the Replot button 1510 next to the graph is clicked. For this implementation, the update is not performed continuously because the Equalizer operation must be temporarily suspended while the coefficient values of the graph are read, so there is typically a slight degradation of the Signal-to-Noise ratio whenever the Equalizer Coefficients graph 1506 is updated. Whenever it is desired to see the graph updated, this can be achieved by clicking on the Replot button 1510.

Figure 16:
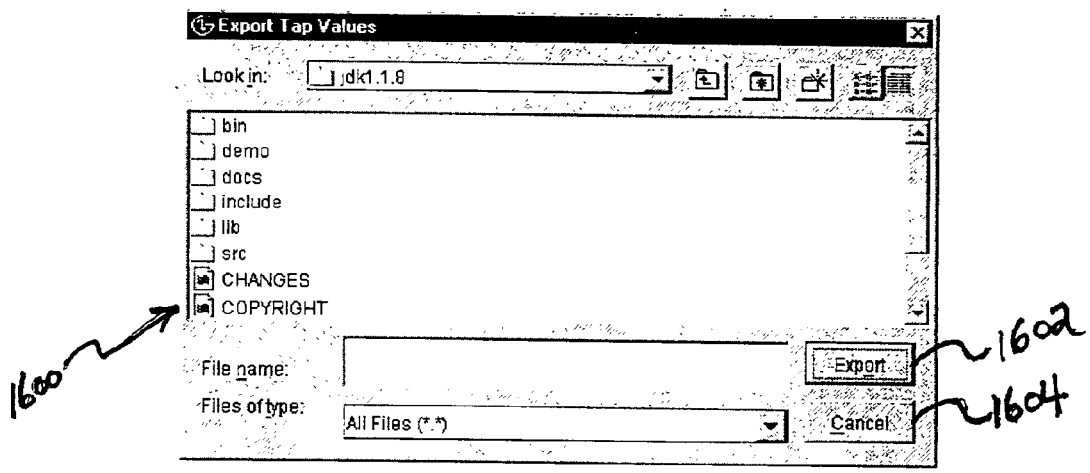
FIG. 16 depicts an Export Tap Values window according to the invention.

The Export button 1512 can allow the values from the graph 1506 to be exported to a file for use in another program, such as a spreadsheet program, or external graphing program. To export to an external file, the following steps can be taken: 1. Click on the Export button 1512. The Export Tap Values window 1600 appears, as depicted in FIG. 16. 2. Browse for a filename where you wish to store the exported tap values, or type in a new filename. Click the Export button 1602 to save the values or the Cancel button 1604 to cancel the Export.

The implementation of these equalizer tap display, replot, and export features is a straightforward software development task, using the well known packages supplied as part of the Java programming environment.

When the user clicks the button to enter the VSB View, the control thread of the software program can lay out the screen for the VSB View. It can also read the equalizer tap coefficients from the DTV receiver 812 and display the equalizer tap information on the screen. Each time the equalizer tap display is to be replotted, this can be repeated. The VSB monitoring thread continually updates the Packet Error Rate and Signal-to-Noise Ratio displays.

Figure 18:
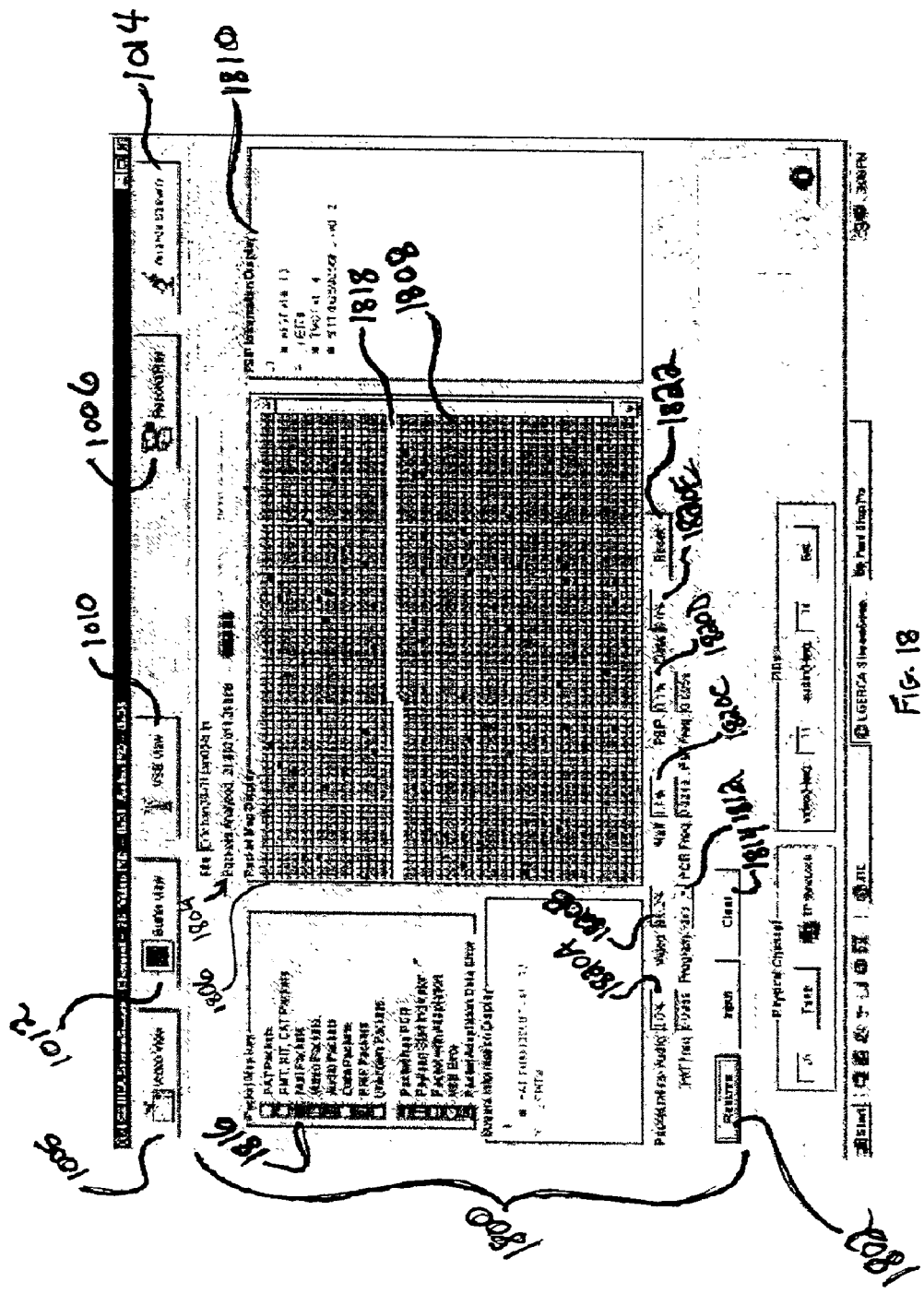
FIG. 18 depicts a screen including the Analyze Stream View portion 1800 according to the invention.

Within the AN functionality, the user can view the percentages of different types of packets in the transport stream, the contents of the various MPEG-2 System tables and the ATSC Program and System Information Protocol (PSIP) tables, and/or the contents of individual packets. The Analyze Stream View portion 1800 is shown in FIG. 18 and is activated by clicking the Analyze Stream button 1014. The Portion 1800 corresponds to FIG. 5 (which is a more detailed, albeit partial, representation of portion 1800).

When the user clicks on the Analyze Stream button, the control program draws the screen for the stream analysis function, as shown in FIG. 5.

Figure 19:
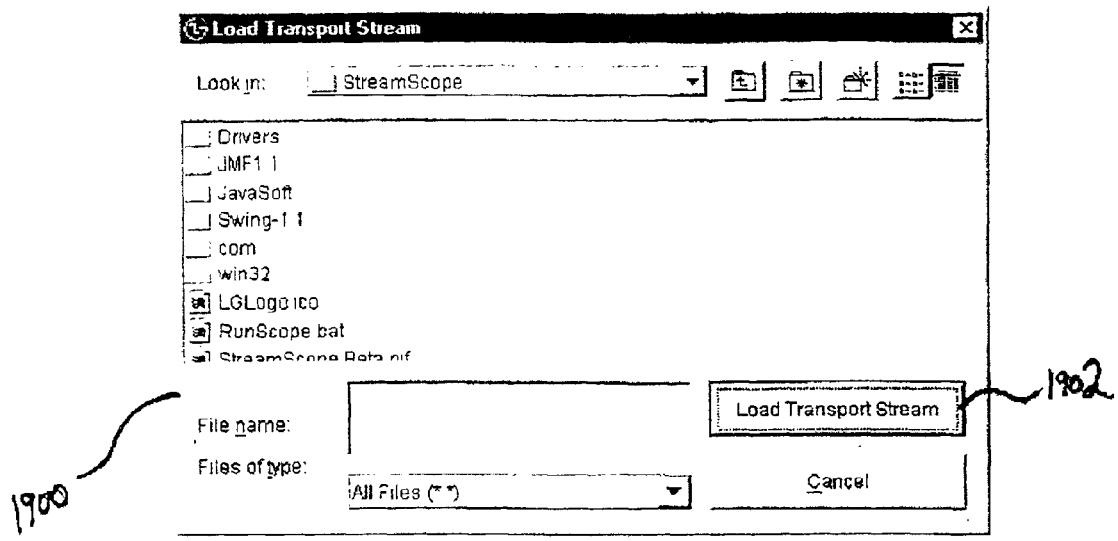
FIG. 19 depicts a Load Transport Stream window according to the invention.

To perform an analysis the user could: 1. Click the Input button. A menu with the choices "VSB" and "file" could appear. If the user selects "file," a Load Transport Stream window 1900, i.e., a file chooser dialog box, could appear (see FIG. 19). 2. Browse and click to highlight and select the file of interest, and then click the Load Transport Stream button 1902. The Load Transport Stream window 1900 closes. 3. When the Analyze Stream View portion 1800 appears, then click the Start/Resume button 1802 to begin parsing through the transport stream file.

Upon retrieving a portion of a stream of data packets representing a DTV transport stream multiplex from memory, the controller 802 is operable (among other things) to generate a graphical depiction on the VDD 816 of the transport stream multiplex. Such a graphical depiction on the VDD 816 for the stream of data packets can take the form of a grid/matrix of geometric shapes each geometric shape representing a packet, as in the transport stream packet map display of FIG. 5.

The Start/Resume button 1802 can be labeled "Start" when the analysis of a packet multiplex has not yet begun, and it can be labeled "Resume" when the analysis is paused midway through. The Start button 1802 can change/toggle into a Pause button as soon as parsing begins and a field 1804 indicating the number of bytes that have been read can be displayed above the Packet Map Display 1806.

As each packet is discovered, it can be displayed as a block 1808 in the Packet Map 1806, with the color indicating the type of packet. Information on ATSC PSIP tables can be gathered during parsing and presented in a tree layout called "PSIP Information Display" 1810. Information on MPEG-2 System tables can be gathered during parsing and presented in a tree layout called "Stream Information Display" 1824. 4. The Pause button can be clicked at any time to pause the parsing operation. Upon such clicking, the Pause button can be changed/toggled into a Resume button 1802 to be used to continue parsing the transport stream. If the Start button is clicked before input is selected, the Load Transport Stream window 1900 can appear. After the file is selected, the analyzer can start.

In this implementation, it is to be noted that the Channel and PID selections are irrelevant, although they do still affect what is seen on the VDD 816 and the AudDD 822.

The processor 806 can continue to parse through the transport stream until the end of the file is reached, at which point the parsing operation stops. The last data displayed can persist in the Packet Map display. Statistics gathered during the parsing operation remain valid until the Reset button is clicked. Tables gathered during the parsing operation remain valid until the Clear button is clicked.

Complete details on the packet map display and its implementation are, again, disclosed in the copending and commonly assigned patent application mentioned above, Attorney Docket No. 2916-131P, filed, Apr. 11, 2001, so only a general description is provided below. The Packet Map display 1806 can depict each packet as a single block 1808 in the grid/matrix of geometric shapes. Individual packet types within the stream are identified using a color and shape coding of the packet block. A legend 1816 can be depicted, e.g., at the left of the packet map, that details the color and shape coding scheme which is used in the Packet Map.

As the processor 806 parses through the transport stream, it continually updates the Packet Map display 1806. The update can be seen as a line 1818, e.g., a white line, which advances down the map, disappearing at the bottom and then reappearing at the top to advance downward again.

Figure 20:
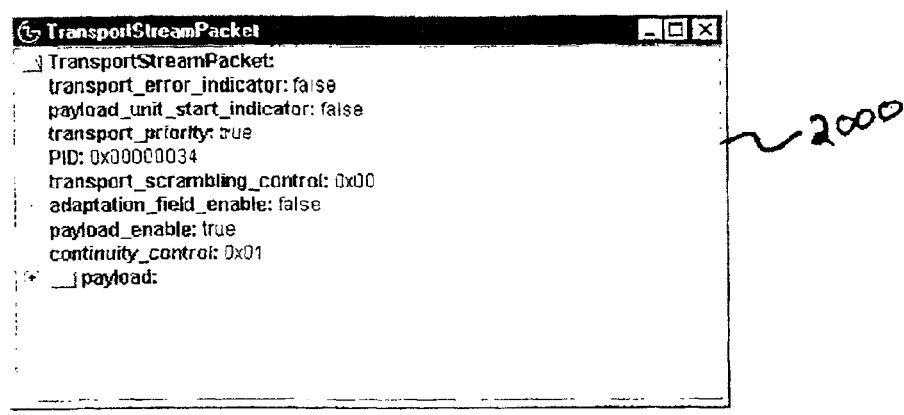
FIG. 20 depicts a TransportStreamPacket pop-up window according to the invention.

Within the Packet Map, any individual packet may be examined by clicking on the packet of interest in the map. A TransportStreamPacket pop-up window 2000 can appear showing the MPEG-2 header for the packet and any "adaptation field" and/or payload that the packet might be carrying (see FIG. 20 for a depiction of an individual packet popup window for an example packet).

The blocks representing all packets except null packets can appear as raised buttons. When the pop-up window is present showing a packet's contents, the button representing the packet can appear to be depressed.

A section is understood to be a data structure comprising a portion of a table, such as the Program Association Table (PAT), Conditional Access Table (CAT), or Program Map Table (PMT). All sections begin with the table_id and end with the CRC_32 field, and their starting points within a packet payload are indicated by the pointer_field mechanism defined in the ISO/IEC 13818-1 International Standard. The program and system information protocol (PSIP) is a collection of tables describing virtual channel attributes, event features, and others. PSIP tables should comply with the ATSC A/65 standard, which makes reference to the private section syntax of ISO/IEC 13818-1.

The analysis of the PAT and program map table (PMT) will be discussed. The PAT (Program Association Table) lists all the programs in the transport stream and gives the packet identification (PID) of the PMT (Program Map Table) for each program. Each PMT gives the PIDs of the individual streams in the program, and tells which PID contains the program clock reference (PCR) for the program. The "Stream Information Display" 1824 at the left of the screen lists the PAT, if present in the stream, and a list of the PMTs which are present in the stream. The default state can be for the list of PMTs to be closed, so only the label "PMTs" shows. The user can open the list by clicking on the plus sign (+) to the left of this label, which can cause the list of the individual PMTs to be shown.

Beside the name of each table can appear some information in the form:

<k>-v<n>:<m>

For the PAT: <k> is the MPEG-2 transport stream ID; <n> is the version number of the most recent instance of the table seen in the stream being parsed; and <m> is the total number of instances of that table which have been seen. For the PMTs: <k> is the MPEG-2 program number of the program; and <n> and <m> have the same meanings as for the PAT.

The user may click on any table in the list to see the details for the table in a pop-up window. The details given can be for the most recent version encountered in the parsing so far. If the user resumes parsing of the stream, this implementation does not update the details shown in the window as new versions are encountered. To see the latest version in this implementation, it is necessary to click on the table in the list again.

Figure 17:
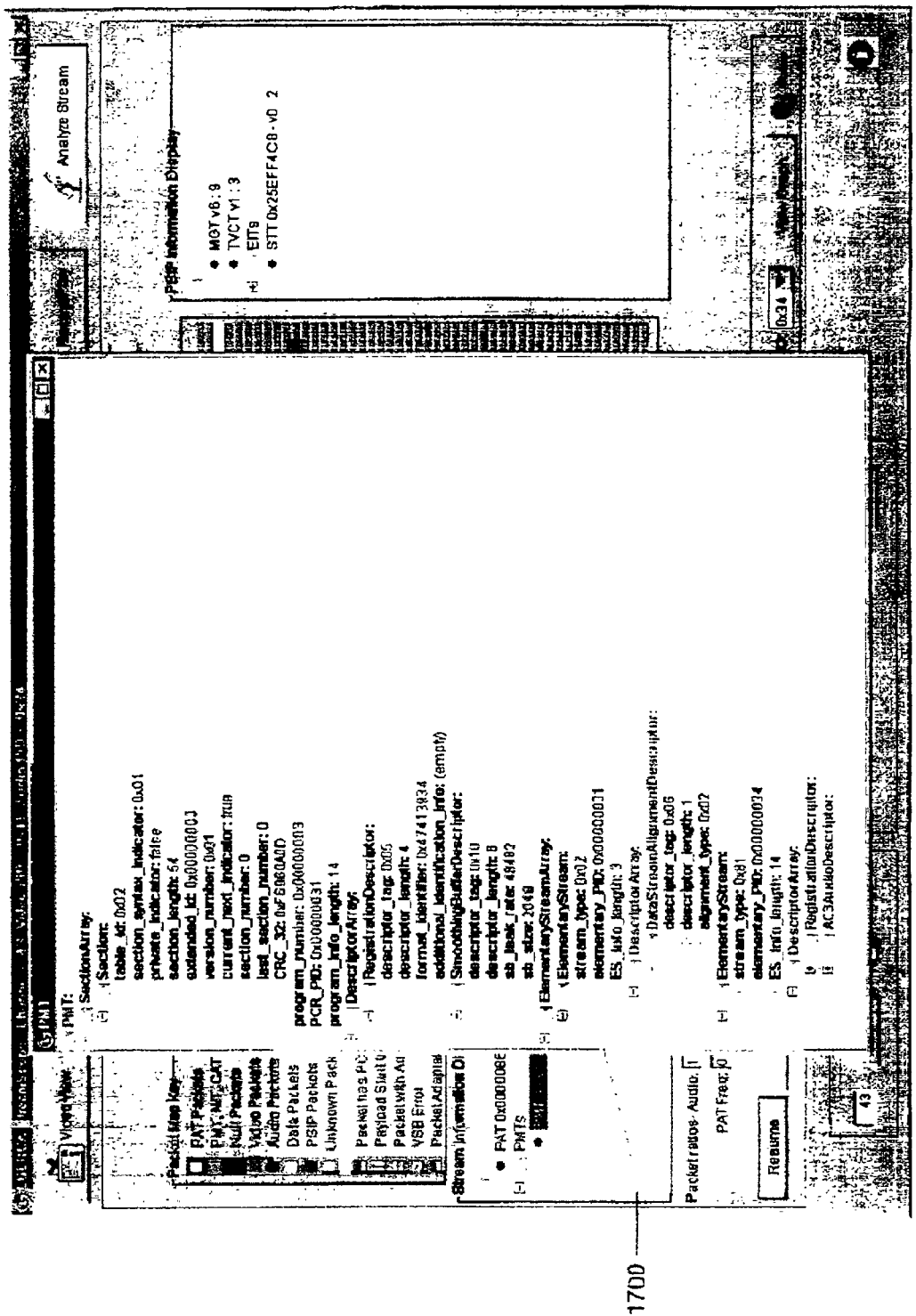
FIG. 17 depicts a PMT (Program Map Table) pop-up window showing the expanded section header according to the invention.

Each pop-up window showing the details of a table can give two types of information about the table. FIG. 17 depicts a PMT pop-up window 1700 for an example PMT. At the top can be a folder labeled "SectionArray" which can be opened by clicking on the plus sign (+) to the left of the label to show a list of the sections used to carry the table. Each section can be opened to show the section header and CRC for that section. Below that can appear the actual contents of the table.

Figure 7:
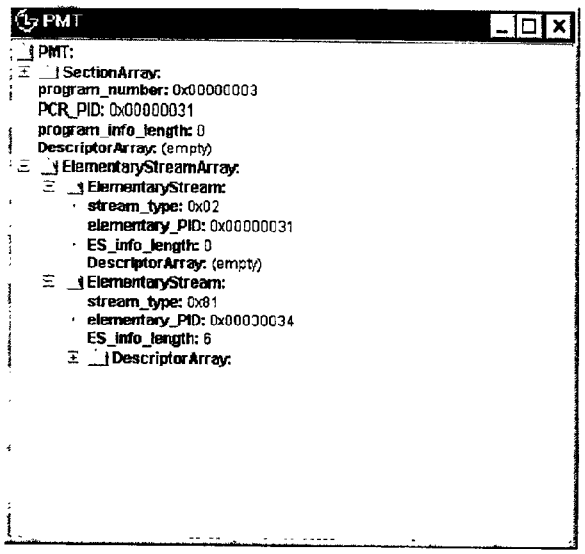
FIG. 7 depicts a PMT pop-up window showing the expanded body of the table according to the invention.

FIG. 17 shows an example where the PMT is being carried in a single section, the SectionArray is open to show the Section, and the Section is open to show the header and CRC. Most of the contents of the PMT are not visible in FIG. 17; the window would have to be scrolled down to see them. FIG. 7 shows an example where the SectionArray is closed, and the actual contents of the PMT are visible. In this example the MPEG-2 program (virtual channel) has two program elements, a video stream and an audio stream. The ElementaryStreamArray is open to show the two ElementaryStream entries, and both of those are open to show the fields describing the program elements.

There are six different types of PSIP tables specified in the ATSC Program and System Information Protocol (PSIP) Standard (A/65). The MGT (Master Guide Table) tells which of the other PSIP tables appear in the transport stream, their size, and where to find them. The STT (System Time Table) tells what time it is, to the nearest second, to allow receivers to set their clocks correctly. The RRT (Rating Region Table) describes the content advisory rating system used to rate program content. The VCT (Virtual Channel Table) tells what virtual channels appear in the transport stream, and gives a good deal of descriptive information about them. The EITs (event information tables) tell what events will appear in the transport stream in the future, giving their start time, duration, title, content advisory rating, and other information. More specifically, an event is a collection of elementary streams with a common time base, an associated start time, and an associated end time. An event is equivalent to the common industry usage of "television program."

Each "EIT Group" covers a 3-hour time period. There should be a minimum of 4 EIT groups (12 hours ahead), and a maximum of 128 (384 hours ahead, or 16 days). Within each EIT group, there should be an EIT for each virtual channel in the stream. The ETTs (Extended Text Tables) give additional descriptive information about virtual channels and/or upcoming events. There may be at most one ETT for each virtual channel and at most one ETT for each of the events described by the EITs within each EIT group. In other words, there potentially can be an ETT for every event and every virtual channel in the system.

The PSIP Information Display 1810 lists all the PSIP tables which have been encountered in the stream. Beside the name of each table in the list, there can be provided some descriptive information of the form:

$$v<n>:<m> \text{ OR } <k>-v<n>:<m> \text{ OR } <j><k>-v<n>:<m>$$

In all cases, <n> can be the version number of the most recent instance of the table encountered, and <m> can be the number of instances encountered. For the STT, <k> can be the value of the system_time field in the STT. For the RRT, <k> can be the rating region to which the table applies. For each EIT, <j> can be the source_id of the virtual channel containing the events in the EIT, and <k> can be the event ID of the first event. In the case of no events, the number displayed can be 0x7fffffff. For each ETT, <k> can be the extended text message id (ETM-id) of the ETT. The list can also show: each EIT Group, with group number and PID; and each ETT Group, with group number and PID. The default state can be for the list of EITs and the list of ETTs to be closed, so only the labels "EITs" and "ETTs" show. The user can open the either list by clicking on the plus sign (+) to the left of its label, which can cause the list of the individual EIT groups or ETT groups to be shown. Each of these groups can in turn be opened by clicking on the plus sign to the left of its label, which can cause the individual EITs or ETTs in the group to be shown.

The user may click on any folder depicted in the pop-up window 1700 of FIG. 17 to access more detailed contents of the table. FIG. 6 shows an example of a pop-up window displaying the contents of a TVCT. The contents given can be for the most recent version encountered in the parsing so far. If the user resumes parsing of the stream, the details shown in the window are not updated as new versions are encountered. To see the latest version, it can be necessary to click on the table in the list again.

Each pop-up window, e.g, 1700, showing the details of a table can give two types of information about the table. At the top is a folder labeled "SectionArray" which can be opened by clicking on the plus sign (+) to the left of the label to show a list of the sections used to carry the table. Each section can be opened to show the section header and CRC for that section. Below that can appear the contents of the table.

FIG. 6 shows an example where the TVCT is being carried in a single section, the SectionArray is open to show the Section, and the Section is open to show the header and CRC. The TerrestrialVirtualChannelArray is not open in this example. The user can open it by clicking on the plus sign (+) to the left of it. This can cause a list of the virtual channels in the TVCT to be displayed. The user can open each channel in the list to get the detailed channel information that is contained in the TVCT.

The PAT (Program Association Table) tells how many virtual channels appear in the broadcast stream and where the PMTs (Program Map Tables) for them can be found. In other words, if the PAT refers to a PMT, then there must be a PMT present in the stream. The ATSC Digital Television Standard A/53 specifies that this table should be broadcast at least once every 100 milliseconds. For each virtual channel there can be a Program Map Table (PMT), which can list the elementary streams in the virtual channel and can give their PIDs. The ATSC A/53 standard specifies that each PMT should be broadcast at least once every 400 milliseconds.

The PCR (Program Clock Reference) values are time stamps that appear in the broadcast stream for the purpose of allowing the DTV receiver to synchronize the decoder clock rate with that of the encoder which encoded the stream. There is typically an independent sequence of PCR values for each virtual channel in the stream. The MPEG-2 system standard (ISO/IEC 13818-1) specifies that PCR values for each virtual channel should be broadcast at least once every 100 milliseconds. The "PAT /Freq" field 1826A can display the interval between the two most recent instances of the PAT. The user can select any virtual channel (MPEG-2 program) in the packet multiplex by way of a selection box labeled "Program" 1812, and the intervals between the two most recent instances of the PCR values and PMT tables in the selected virtual channel can be displayed in boxes labeled "PCR Freq" 1828B and "PMT Freq" 1826C. These displays can be in black text if the values are within the specified limits and in red text otherwise.

An ATSC-compliant transport stream may have a number of different types of transport packets: audio, video, data, PSIP, null, and unknown. Packets of unknown type indicate some kind of problem with the PSIP tables, since the tables should allow the DTV receiver to identify the type of every packet that appears in the broadcast stream. However, almost all packets are "unknown" to the analyzer until the PAT and PMTs are encountered in the DTV packet transport multiplex, so it is normal to encounter a large block of packets of the unknown type in the packet map at the initial stage of analysis, and to see these reflected in the packet percentages.

For the purposes of this classification, PSIP data can be broadly interpreted to include the PAT, PMT, CAT (Conditional Access Table), and NIT (Network Information Table), as well as the MGT, virtual channel table (VCT), STT, RRT, EITs and ETTs.

The Analyze Stream View portion 1800 can include cumulative packet statistics (e.g., percentage of total) for audio (field 1820A), video (field 1820B), data (field 1820C), PSIP (1820D), unknown (not shown), and null (field 1820E) packets gathered during the parsing of the packet multiplex. This can be a running display that is updated continuously during parsing, and represents the statistics over the multiplex up until the current point. To find the statistics over an entire packet multiplex file, it is necessary to parse the entire file before checking the statistics.

Statistics over a particular portion of the file can be viewed by clicking on the Reset button 1822 to set the statistics counters back to zero at the beginning of the portion of interest, effectively clearing the statistics gathered up to the current point, and then resuming the parsing of the stream.

Within the M functionality, the user can view the same information as within the AN functionality, except that the packet map may not be displayed, and the user may not be able to drill down into the contents of individual packets. The primary difference between the M functionality and the AN functionality is that with the M functionality the analysis is done on a packet multiplex arriving in real time from a live broadcast, and with the AN functionality the analysis is done on a recorded packet multiplex contained in a file. The user can access the M functionality by clicking on the Analyze Stream button 1014. The portion 1800 corresponds to FIG. 5, which is a more detailed, albeit partial, representation.

To monitor a live broadcast the user could: 1. Click the Input button. A small pop-up menu with the choices "VSB" and "file" could appear. 2. Click on the "VSB" choice. 3. Click the Start/Resume button 1802 to begin parsing the packet multiplex coming in live over the RF input. This button can be labeled "Start" when the analysis of a packet multiplex has not yet begun, and it can be labeled "Resume" when the analysis is paused in midstream. Note, however, that when analysis is paused on a live stream, the input data is not paused, since it is a live stream. When analysis is resumed, it will pick up at the current point in the stream, skipping over all the data that went by in the meantime.

The software to implement the AN and M functionality can be organized as follows:

The analysis thread of the software program can maintain a large (say, one megabyte) ring buffer to hold the packets while they are being analyzed. (A ring buffer is a well known software device whereby each block of new data coming into the buffer is written right after the previous block, with wraparound to the beginning when the end of the buffer is reached. Processing of the data in a ring buffer takes place the same way, wrapping around to the beginning when the end of the buffer is reached. Position pointers are maintained so that the processing never goes past the end of the new data.)

When file input is selected and the file is specified (for AN functionality), the analysis thread can read packets from the file into the ring buffer in memory. When VSB input is selected (for M functionality), the analysis thread can command the DTV receiver card 812 to transfer packets into the ring buffer. Other than this difference in the way data gets into the ring buffer, the processing for AN and M functionality is the same. Each packet can be assigned a 64-bit packet number, indicating its position in the packet multiplex. (The numbering can start at 0 when the instrument is first turned on, and it would then be millions of years before the 64-bit counter would overflow.)

A "Demultiplexer" software module can go through the packets in the ring buffer in sequence. It can look at the PID in each packet and pass the packet on to any other module that has registered for that PID (using the standard "listener" mechanism in Java to register for events). For the sake of efficiency, it can pass just a pointer to the packet, not the actual packet itself. For the monitoring and analysis functionality described in this disclosure there can be three modules that listen for PIDs and process the packets they receive: "Statistics" module, "Tables" module, and "Packet Map" module. The Packet Map module can be active only when analyzing a file. The Statistics and Tables modules can be active for both file analysis (AN functionality) and live input monitoring (M functionality).

The Packet Map module can register with the Demultiplexer module to listen for all PIDs. It can also register to be notified by the Tables module whenever the Tables module discovers new information about the type of any PID (audio, video, data, PSIP, null, or unknown), and in the case of audio, video or data packets, the MPEG-2 program number of the virtual channel containing the stream identified by the PID. The Packet Map module can use this information to maintain the Packet Map display, including allowing the user to drill down into the contents of any individual packet displayed in the Packet Map.

The Statistics module can register with the Demultiplexer module to listen for all PIDs. It can also register with the Tables module to be notified of the following: 1. any new information about the type of any PID (audio, video, data, PSIP, null, or unknown); 2. any new information about the PIDs contained in each virtual channel; 3. any new information about which PID contains the PCR values for each virtual channel.

With the information about PID types, it can easily maintain statistics on packet ratios and update the displays on packet ratios for audio 1820A, video 1820B, null 1820C, PSIP 1820D, and data 1820E packets periodically. It could equally well maintain and display statistics on the percentage of packets in each PID. With the additional information about what PIDs are in each program, it could equally well maintain and display statistics on the percentage of packets in each virtual channel, the percentage of packets within each virtual channel that are audio, video, and data packets, and so on. When monitoring a live broadcast, it could easily maintain and display percentages over a sliding window, and the maximum and minimum of such percentages over such sliding windows, rather than just the values over the entire time period since it began monitoring.

With the information on which PIDs contain PCR values for each MPEG-2 program, the Statistics module can easily maintain the PCR frequencies display 1828A. It could equally easily maintain average and maximum values over sliding windows, as well as the most recent value.

The Tables module can register with the Demultiplexer module to listen on all PIDs that contain MPEG-2 System or ATSC PSIP tables. It can do this as follows: When monitoring or analysis first starts, it can register to listen for PID 0x0000, which contains the PAT, and PID 0x1FFB, which contains the MGT, TVCT, STT, and RRT. When it receives packets containing a PAT, it can parse them and discover what PIDs to listen on for the PMTs, and it can register for them. When it receives packets containing an MGT, it can parse them and discover what PIDs to listen on for the EITs and ETTs, and it can register for them. Each time packets arrive containing a new version of the PAT or MGT, it can parse them and if necessary adjust the set of PIDs it is registered to listen for.

As packets arrive on any of the PIDs it is registered for, it can parse the tables in them and update its list of what tables are in the packet multiplex, the details of what is in the individual tables, and the time interval between successive instances of that table. This is a straightforward task, given the descriptions of the tables and their packing into MPEG-2 packets given in the MPEG-2 Systems standard (ISO/IEC 13818-1) and the ATSC PSIP standard (ATSC document A/65). It is also a straightforward task to update the Stream Information Display area 1824, the PSIP Information Display area 1810, and the PAT frequency display 1826 and PMT frequency display 1828B as new tables arrive. When the user clicks on a table in these displays, the control thread makes an appropriate call to the Tables module, and gets the information necessary to create the pop-up window for the table.

The Tables module can also notify any module that has registered as a listener about: 1. the arrival of each table instance, 2. any change in the type of any PID, 3. any change in the set of the PIDs containing PCR values, or 4. any change in the set of PIDs belonging to each virtual channel. (The information for the last three of these items can be obtained easily from the PAT, the PMTs, and the MGT.)

With this same approach it would not be difficult to support additional AN functionality and M functionality by just adding additional modules which would register for the information they need, or by extending slightly the modules already described. Examples include: 1. analysis of PCR clock rate and jitter, 2. analysis of audio and video buffer compliance, 3. checking correctness of the continuty counts in the packet headers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An integrated digital television (DTV) diagnostic instrument comprising:

at least one of a video display device (VDD) and an audio display device (AudDD);

DTV means for receiving a live DTV signal, reconstructing at least one of a video stream and an audio stream from said DTV signal, and displaying at least one of said video steam and said audio stream on said VDD or said AudDD, respectively;

monitoring means, responsive to said DTV means for monitoring digital properties of the live DTV signal; and measurement means for quantitatively monitoring at least one metric of the quality of the live DTV signal, wherein said measurement means is operable to display at least one of the following:

a first graph of a carrier to noise ratio of said DTV signal at an input to a vestigial side band decoder, a second graph of a packet error count, and a third graph of equalizer tap coefficients.

2. An integrated digital television (DTV) diagnostic instrument comprising:

at least one of a video display device (VDD) and an audio display device (AudDD);

means for performing at least one of extracting a live DTV stream from a live DTV signal and reading a recorded DTV stream from a storage device;

means for reconstructing at least one of a video stream and an audio stream from said live or recorded DTV stream, and to display at least one of said video stream and said audio stream on said VDD or said AudDD, respectively; and an analysis component to examine and determine digital properties of a DTV stream, wherein said analysis component is operable upon at least one of said live DTV stream and said recorded DTV stream to do at least one of the following for each said DTV stream:

check for correct syntax of MPEG-2 transport packets;

determine existence, syntax, consistency, and frequency of at least one of MPEG-2 System tables and ATSC PSIP tables;

determine percentage of transport stream used by various data types, channels, and elementary streams; and determine transmission frequency of the Program Clock References (PCRs).

3. The instrument of claim 2, wherein said instrument includes both said VDD and said AudDD, and wherein said reconstructing means is operable to reconstruct and to display both of said video stream on said VDD and said audio stream on said AudDD.

4. The instrument of claim 2, further comprising:

means for recording said live DTV stream signal.

5. The instrument of claim 2, further comprising:

measuring means for quantitatively monitoring at least one metric of the analog signal quality of the live DTV signal.

6. The instrument of claim 2, wherein at least a part of said instrument is embodied by a processor running software.

7. The instrument of claim 2, wherein said analysis component is operable upon said recorded DTV stream to further do at least one of:

drill down into the contents of individual MPEG-2 transport packets; and present a visualization of the individual MPEG-2 transport packets in the broadcast stream.

8. The instrument of claim 2, further comprising means for displaying pointing-device-clickable buttons on said VDD that are used to invoke functionalities of said instrument.

9. The instrument of claim 8, wherein said displaying means is embodied by a processor running software.

10. The instrument of claim 8, wherein said buttons are arranged on said VDD in order of a coarsest level of information granularity to a finest level of information granularity such that the arrangement takes advantage of a user's tendency to progress from using coarse tools to fine tools when solving a problem.

11. The instrument of claim 2, wherein the instrument is housed in an easily portable chassis.

12. The instrument of claim 2, wherein said analysis component further performs at least one of the following:
   generating alarms upon occurrences of errors and upon exceeding specified thresholds; and
   triggering a recording upon occurrences of errors and upon exceeding specified thresholds.

13. An integrated digital television (DTV) test instrument comprising:
   a video display device (VDD);
   DTV circuitry (AV) to receive a DTV signal, to reconstruct at least one of a video stream and an audio stream from said DTV signal; and
   a controller to perform at least one of
      monitoring functionality, upon an output of said DTV circuitry, that monitors digital properties of a live DTV signal, and
      analysis circuitry, upon said output of said DTV circuitry, analyzes digital properties of a recorded DTV signal;
   said controller being operable to display pointing-device-clickable buttons on said VDD representing said monitoring functionalities and said analysis functionalities,
   wherein said buttons are arranged on said VDD in order of a coarsest level of information granularity to a finest level of information granularity such that the arrangement takes advantage of a user's tendency to progress from using coarse tools to fine tools when solving a problem.

14. The instrument of claim 13, wherein said controller is embodied by a processor running software.

15. For an integrated digital television (DTV) diagnostic instrument having at least one of a video display device (VDD) and an audio display device (AudDD), the instrument further having DTV circuitry (AV) to receive a DTV signal, to reconstruct at least one of a video stream and an audio stream from said DTV signal, and to display at least one of said video stream and said audio stream on said VDD or said AudDD, respectively, and the instrument further having a programmable processor,
   a processor-readable article of manufacture having embodied thereon software comprising:
   a plurality of code segments including at least one of
      a first segment to monitor to digital properties of a live DTV signal from said DTV circuitry, and
      a second code segment to analyze digital properties of a recorded DTV signal; and
      a third code segment to display pointing-device-clickable buttons on said VDD representing the monitoring functionalities and the analysis functionalities,
   wherein said third code segment is operable to arrange said buttons on said VDD in order of a coarsest level of information granularity to a finest level of information granularity such that the arrangement takes advantage of a user's tendency to progress from using coarse tools to fine tools when solving a problem.

16. An integrated digital television (DTV) diagnostic instrument comprising:
   at least one of a video display device (VDD) and an audio display device (AudDD);
   DTV circuitry to receive a DTV signal, to reconstruct at least one of a video stream and an audio stream from said DTV signal, and to display at least one of said video stream and said audio stream on said VDD or said AudDD, respectively; and
   at least one of
      monitoring circuitry, responsive to said DTV circuitry, to monitor digital properties of a live DTV signal, and
      analysis circuitry, responsive to said DTV circuitry, to analyze digital properties of a recorded DTV signal,
   wherein said analysis circuitry is operable upon a recorded output of said DTV circuitry to do at least one of:
   drill down into the contents of individual MPEG-2 transport packets, and
   present a visualization of the individual MPEG-2 transport packets in the broadcast stream.

17. An integrated digital television (DTV) diagnostic instrument comprising:
   at least one of a video display device (VDD) and an audio display device (AudDD);
   DTV circuitry (AV) to receive a DTV signal, to reconstruct at least one of a video stream and an audio stream from said DTV signal, and to display at least one of said video stream and said audio stream on said VDD or said AudDD, respectively;
   at least one of
      monitoring circuitry (M), responsive to said DTV circuitry, to monitor digital properties of a live DTV signal, and
      analysis circuitry (AN), responsive to said DTV circuitry, to analyze digital properties of a recorded DTV signal; and
   quantitative circuitry (VSB) to quantitatively monitor at least one metric of the quality of a live DTV signal,
   wherein said VSB is operable to display at least one of a first graph of a carrier to noise ratio of said DTV signal at an input to a vestigial side band (VSB) decoder, a second graph of a packet error count and a plot of equalizer tap coefficients.

18. The instrument of claim 17, further comprising:
   means for recording said DTV signal.

19. An integrated digital television (DTV) diagnostic instrument comprising:
   at least one of a video display device (VDD) and an audio display device (AudDD);
   DTV circuitry (AV) to receive a DTV signal, to reconstruct at least one of a video stream and an audio stream from said DTV signal, and to display at least one of said video stream and said audio stream on said VDD or said AudDD, respectively;
   at least one of
      monitoring circuitry (M), responsive to said DTV circuitry, to monitor digital properties of a live DTV signal, and
      analysis circuitry (AN), responsive to said DTV circuitry, to analyze digital properties of a recorded DTV signal; and
   a controller operable to display pointing-device-cickable buttons on said VDD that are used to invoke functionalities of said monitoring circuitry and said analysis circuitry,
   wherein said buttons are arranged on said VDD in order of a coarsest level of information granularity to a finest level of information granularity such that the arrangement takes advantage of a user's tendency to progress from using coarse tools to fine tools when solving a problem.

* * * * *